US012763886B2

(12) United States Patent
Li et al.

(10) Patent No.: US 12,763,886 B2
(45) Date of Patent: Oct. 13, 2026

(54) APPARATUS, SYSTEM, AND METHOD OF CHANNEL SOUNDING OVER A WIDE CHANNEL BANDWIDTH

(71) Applicant: Intel Corporation, Santa Clara, CA (US)

(72) Inventors: Qinghua Li, San Ramon, CA (US); Xiaogang Chen, Portland, OR (US); Po-Kai Huang, San Jose, CA (US); Yonathan Segev, Sunnyvale, CA (US); Laurent Cariou, Milizac (FR); Cheng Chen, Camas, WA (US)

(73) Assignee: INTEL CORPORATION, Santa Clara, CA (US)

(*) Notice: Subject to any disclaimer, the term of this patent is extended or adjusted under 35 U.S.C. 154(b) by 274 days.

(21) Appl. No.: 18/725,321

(22) PCT Filed: Sep. 30, 2022

(86) PCT No.: PCT/US2022/045299
§ 371 (c)(1),
(2) Date: Jun. 28, 2024

(87) PCT Pub. No.: WO2023/154084
PCT Pub. Date: Aug. 17, 2023

(65) Prior Publication Data

US 2025/0070926 A1 Feb. 27, 2025

Related U.S. Application Data

(60) Provisional application No. 63/308,351, filed on Feb. 9, 2022.

(51) Int. Cl.
*H04L 5/00* (2006.01)
*H04L 27/34* (2006.01)

(52) U.S. Cl.
CPC ............ *H04L 5/0007* (2013.01); *H04L 27/34* (2013.01)

(58) Field of Classification Search
CPC ..... H04L 5/0007; H04L 27/34; H04L 5/0048; H04L 27/2634; H04L 27/2613; H04W 84/12
See application file for complete search history.

(56) References Cited

U.S. PATENT DOCUMENTS

2019/0132155 A1* 5/2019 Jiang .................. H04L 25/0228
2021/0211326 A1 7/2021 Jiang et al.
(Continued)

FOREIGN PATENT DOCUMENTS

WO 2018-031134 2/2018
WO 2021-182744 9/2021

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.
(Continued)

*Primary Examiner* — Ricky Q Ngo
*Assistant Examiner* — Kabir U Jahangir
(74) *Attorney, Agent, or Firm* — Shichrur & Co.

(57) ABSTRACT

For example, a wireless communication device may be configured to generate a wide bandwidth Long Training Field (LTF) configured for channel sounding over a wide channel bandwidth of at least 320 Megahertz (MHz). For example, the wide bandwidth LTF may include a plurality of Orthogonal Frequency Division Multiplexing (OFDM) symbols over the wide channel bandwidth. For example, the
(Continued)

wireless communication device may be configured to transmit a Null Data Packet (NDP) over the wide channel bandwidth. For example, the NDP may include a non-High-Throughput (non-HT) Short Training Field (L-STF), a non-HIT LTF (L-LTF) after the L-STF, a non-HT Signal (L-SIG) field after the L-LTF, a Repeated L-SIG (RL-SIG) field after the L-SIG field, and the wide bandwidth LTF after the RL-SIG field.

20 Claims, 16 Drawing Sheets

(56) References Cited

U.S. PATENT DOCUMENTS

| | | | | |
|---|---|---|---|---|
| 2021/0218527 | A1 | 7/2021 | Li et al. | |
| 2022/0038241 | A1* | 2/2022 | Vermani | H04L 5/0053 |
| 2024/0381144 | A1* | 11/2024 | Yu | H04L 5/00 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 1: Enhancements for High-Efficiency WLAN, IEEE Std 802.11ax™-2021 (Amendment to IEEE Std 802.11-2020), Approved Feb. 9, 2021, 767 Pages.

International Search Report and the Written Opinion for International Application No. PCT/US2022/045299, mailed on Jan. 20, 2023, 11 pages.

* cited by examiner

APPARATUS, SYSTEM, AND METHOD OF CHANNEL SOUNDING OVER A WIDE CHANNEL BANDWIDTH

CROSS REFERENCE

This Application claims the benefit of and priority from U.S. Provisional Patent Application No. 63/308,351 entitled "320 Megahertz Ranging and Sensing", filed Feb. 9, 2022, the entire disclosure of which is incorporated herein by reference.

TECHNICAL FIELD

Aspects described herein generally relate to channel sounding over a wide channel bandwidth.

BACKGROUND

Some wireless communication devices may be configured to support ranging techniques over a wireless communication channel, e.g., according to an IEEE 802.11az Specification.

For example, the ranging techniques may be implemented to determine ranging information based on measurements performed on wireless communications.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
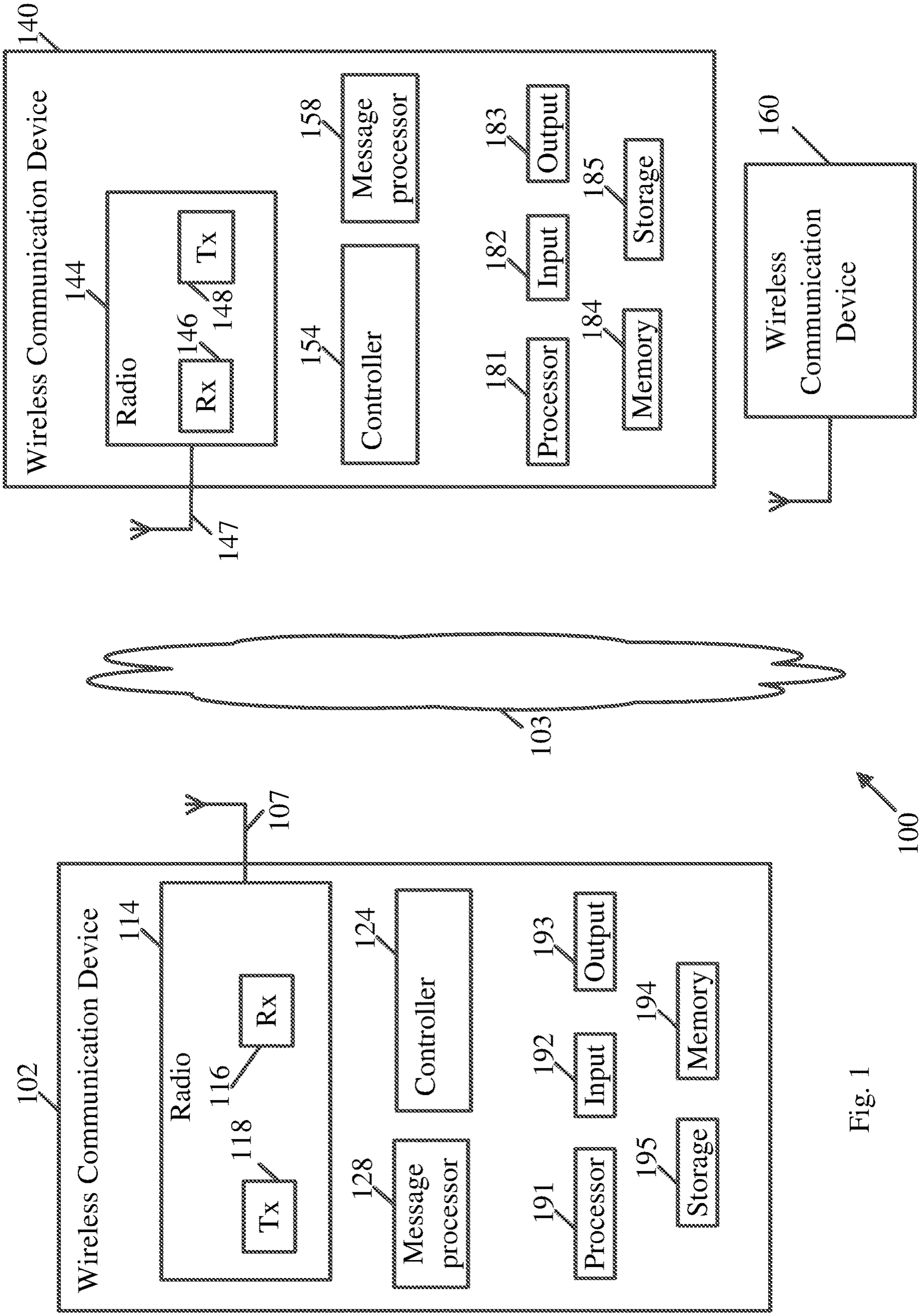
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December 2020); IEEE 802.11ax (IEEE P802.11ax-2021, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications; Amendment 1: Enhancements for High-Efficiency WLAN, February 2021); IEEE 802.11az (P802.11az™/D6.0; Draft Standard for Information technology—Telecommunications and information exchange between systems Local and metropolitan area networks—Specific requirements; Part 11: Wireless LAN Medium Access Control 11 (MAC) and Physical Layer (PHY) Specifications; Amendment 4: Enhancements for positioning, August 2022); and/or IEEE 802.11be (IEEE P802.11be/D2.0 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), May 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mm Wave frequency band.

Some demonstrative aspects may be used in conjunction with a wireless communication network communicating over the sub-10 GHz frequency band and/or the mm Wave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects may be implemented by an Extremely High Throughput (EHT) STA, which may include for example, a STA having a radio transmitter, which is capable of operating on a channel that is in frequency bands between 1 GHz and 7.250 Ghz. The EHT STA may perform other additional or alternative functionality. Other aspects may be implemented by any other apparatus, device and/or station.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 160, and/or one more other devices.

In some demonstrative aspects, devices 102, 140, and/or 160 may include a mobile device or a non-mobile, e.g., a static, device.

For example, devices 102, 140, and/or 160 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 160 may be capable of communicating content, data, information and/or signals via a wireless medium (WM) 103. In some demonstrative aspects, wireless medium 103 may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, WM 103 may include any other type of channel over any other frequency band.

In some demonstrative aspects, device 102, device 140, and/or device 160 may include one or more radios including circuitry and/or logic to perform wireless communication between devices 102, 140, 160, and/or one or more other wireless communication devices. For example, device 102 may include at least one radio 114, and/or device 140 may include at least one radio 144.

In some demonstrative aspects, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, a mmWave band, and/or any other band, for example, a 5 G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a single antenna or a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, antennas 107 and/or antennas 147 may be connected to, and/or associated with, one or more Radio Frequency (RF) chains.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102. e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, device 102, device 140, and/or device 160 may include, operate as, perform the role of, and/or perform one or more functionalities of, one or more STAs. For example, device 102 may include at least one STA, device 140 may include at least one STA, and/or device 160 may include at least one STA.

In some demonstrative aspects, device 102, device 140, and/or device 160 may include, operate as, perform the role of, and/or perform one or more functionalities of, one or more EHT STAs. For example, device 102 may include, operate as, perform the role of, and/or perform one or more functionalities of, at least one EHT STA; device 140 may include, operate as, perform the role of, and/or perform one or more functionalities of, at least one EHT STA; and/or device 160 may include, operate as, perform the role of, and/or perform one or more functionalities of, at least one EHT STA.

In other aspects, devices 102, 140 and/or 160 may include, operate as, perform the role of, and/or perform one or more functionalities of, any other wireless device and/or station, e.g., a WLAN STA, a Wi-Fi STA, and the like.

In some demonstrative aspects, device 102, device 140, and/or device 160 may be configured operate as, perform the role of, and/or perform one or more functionalities of, an access point (AP), e.g., an EHT AP, or any other AP.

In some demonstrative aspects, device 102, device 140, and/or device 160 may be configured to operate as, perform the role of, and/or perform one or more functionalities of, a non-AP STA, e.g., an EHT non-AP STA, pr any other non-AP STA.

In other aspects, device 102, device 140, and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects devices 102, 140 and/or 160 may be configured to communicate over an EHT network, and/or any other network. For example, devices 102, 140 and/or 160 may perform Multiple-Input-Multiple-Output (MIMO) communication, for example, for communicating over the EHT networks, e.g., over an EHT frequency band, e.g., in frequency bands between 1 GHz and 7.250 GHz.

In some demonstrative aspects, devices 102, 140 and/or 160 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, devices 102, 140 and/or 160 may be configured according to one or more standards, for example, in accordance with an IEEE 802.11ax Standard, an IEEE 802.11az Standard, and/or an IEEE 802.11be Standard, which may be configured, for example, to enhance the efficiency and/or performance of an IEEE 802.11 Specification, which may be configured to provide Wi-Fi connectivity.

Some demonstrative aspects may enable, for example, to significantly increase the data throughput defined in the IEEE 802.11-2020 Specification, for example, up to a throughput of 30 Giga bits per second (Gbps), or to any other throughput, which may, for example, satisfy growing demand in network capacity for new coming applications.

Some demonstrative aspects may be implemented, for example, to support increasing a transmission data rate, for example, by applying MIMO and/or Orthogonal Frequency Division Multiple Access (OFDMA) techniques.

In some demonstrative aspects, devices 102, 140 and/or 160 may be configured to communicate MIMO communications and/or OFDMA communication in frequency bands between 1 GHz and 7.250 GHz.

In some demonstrative aspects, device 102, device 140 and/or device 160 may be configured to support one or more mechanisms and/or features, for example, OFDMA, Single User (SU) MIMO, and/or Multi-User (MU) MIMO, for example, in accordance with an IEEE 802.11be Standard and/or any other standard and/or protocol.

In some demonstrative aspects, device 102, device 140 and/or device 160 may include, operate as, perform a role of, and/or perform the functionality of, one or more EHT STAs. For example, device 102 may include, operate as, perform a role of, and/or perform the functionality of, at least one EHT STA, device 140 may include, operate as, perform a role of, and/or perform the functionality of, at least one EHT STA, and/or device 160 may include, operate as, perform a role of, and/or perform the functionality of, at least one EHT STA.

In some demonstrative aspects, devices 102, 140 and/or 160 may implement a communication scheme, which may include Physical layer (PHY) and/or Media Access Control (MAC) layer schemes, for example, to support one or more applications, and/or increased throughput, e.g., throughputs up to 30 Gbps, or any other throughput.

In some demonstrative aspects, the PHY and/or MAC layer schemes may be configured to support OFDMA techniques, SU MIMO techniques, and/or MU MIMO techniques.

In some demonstrative aspects, devices 102, 140 and/or 160 may be configured to implement one or more mechanisms, which may be configured to enable SU and/or MU communication of Downlink (DL) and/or Uplink frames (UL) using a MIMO scheme.

In some demonstrative aspects, device 102, device 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative aspects, devices 102, 140, and/or 160 may be configured to communicate over an EHT network, and/or any other network and/or any other frequency band. For example, devices 102, 140, and/or 160 may be configured to communicate DL transmissions and/or UL transmissions, for example, for communicating over the EHT networks.

In some demonstrative aspects, devices 102, 140 and/or 160 may be configured to communicate over a channel bandwidth, e.g., of at least 20 Megahertz (MHz), in frequency bands between 1 GHz and 7.250 GHz.

In some demonstrative aspects, devices 102, 140 and/or 160 may be configured to implement one or more mechanisms, which may, for example, support communication over a wide channel bandwidth (BW) ("channel width") (also referred to as a "wide channel" or "wide BW") covering two or more channels, e.g., two or more 20 MHz channels, e.g., as described below.

In some demonstrative aspects, wide channel mechanisms may include, for example, a mechanism and/or an operation whereby two or more channels, e.g., 20 MHz channels, can be combined, aggregated or bonded, e.g., for a higher bandwidth of packet transmission, for example, to enable achieving higher throughputs, e.g., when compared to transmissions over a single channel. Some demonstrative aspects are described herein with respect to communication over a channel BW including two or more 20 MHz channels, however other aspects may be implemented with respect to communications over a channel bandwidth, e.g., a "wide" channel, including or formed by any other number of two or more channels, for example, a bonded or aggregated channel including a bonding or an aggregation of two or more channels.

In some demonstrative aspects, device 102, device 140 and/or device 160 may be configured to communicate one or more transmissions over one or more channel BWs, for example, including a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative aspects, device 102, device 140 and/or device 160 may be configured to support ranging operations and/or communications over a wide channel bandwidth, e.g., as described below.

In some demonstrative aspects, device 102, device 140 and/or device 160 may be configured to support ranging operations and/or communications over a bandwidth of 20 MHz, 40 MHz, 80 MHz, or 160 MHz, for example, in accordance with an IEEE 802.11az Specification.

In some demonstrative aspects, device 102, device 140 and/or device 160 may be configured to support ranging operations and/or communications over bandwidth wider than 160 MHz, e.g., as described below.

In some demonstrative aspects, device 102, device 140 and/or device 160 may be configured to support ranging operations and/or communications, for example, while utilizing one or more operations and/or communications, which may be configured to support communications over bandwidths wider than 160 MHz, e.g., in accordance with an IEEE 802.11be Specification.

In some demonstrative aspects, device 102, device 140 and/or device 160 may be configured to communicate transmissions configured for channel sounding over bandwidths wider than 160 MHz, e.g., as described below.

In some demonstrative aspects, device 102, device 140 and/or device 160 may be configured to communicate transmissions, for example, a sounding signal, configured for channel sounding over bandwidths wider than 160 MHz, for example, to provide a technical solution to support wireless sensing over bandwidths wider than 160 MHz, e.g., as described below.

In some demonstrative aspects, device 102, device 140 and/or device 160 may be configured to communicate transmissions, for example, a secure sounding signal, configured for channel sounding over channel bandwidths wider than 160 MHz, for example, to provide a technical solution to support secure wireless sensing over channel bandwidths wider than 160 MHz, e.g., as described below.

In some demonstrative aspects, device 102, device 140 and/or device 160 may be configured to implement wireless sensing techniques to determine wireless sensing information based on measurements performed according to the channel sounding over the channel bandwidths wider than 160 MHz, e.g., as described below.

In some demonstrative aspects, device 102, device 140 and/or device 160 may be configured to communicate transmissions, for example, a sounding signal, configured for channel sounding over channel bandwidths wider than 160 MHz, for example, to provide a technical solution to support wireless ranging over channel bandwidths wider than 160 MHz, e.g., as described below.

In some demonstrative aspects, device 102, device 140 and/or device 160 may be configured to communicate transmissions, for example, a secure sounding signal, configured for channel sounding over channel bandwidths wider than 160 MHz, for example, to provide a technical solution to secure wireless ranging over channel bandwidths wider than 160 MHz, e.g., as described below.

In some demonstrative aspects, device 102, device 140 and/or device 160 may be configured to implement ranging techniques to determine ranging information based on measurements performed according to the channel sounding over the channel bandwidths wider than 160 MHz, e.g., as described below.

In some demonstrative aspects, device 102, device 140 and/or device 160 may be configured to communicate transmissions configured for channel sounding over a wide channel bandwidth of at least 320 MHz, e.g., as described below.

In some demonstrative aspects, device 102, device 140 and/or device 160 may be configured to communicate transmissions configured for channel sounding over a wide channel bandwidth of 320 MHz, e.g., as described below.

In other aspects, device 102, device 140 and/or device 160 may be configured to communicate transmissions configured for channel sounding over any other additional or alternative channel bandwidth.

In some demonstrative aspects, device 102, device 140 and/or device 160 may be configured to communicate a wide channel bandwidth sounding signal, e.g., a secure wide channel bandwidth sounding signal, which may be configured for channel sounding over bandwidths wider than 160 MHz, for example, according to a wide channel bandwidth sounding scheme, e.g., as described below, In some demonstrative aspects, the wide channel bandwidth sounding signal may be based on, and/or compatible with, a sounding signal (160 MHz sounding signal) configured for a bandwidth of 160 MHz, e.g., as described below.

In some demonstrative aspects, the wide channel bandwidth sounding signal may be generated, for example, based on duplication of the 160 MHz sounding signal, for example, in a frequency domain, e.g., as described below.

In some demonstrative aspects, the wide channel bandwidth sounding signal may be generated, for example, based on a segment parsing mechanism, which may be configured for the wide channel bandwidth, e.g., as described below.

In some demonstrative aspects, the wide channel bandwidth sounding signal may be generated, for example, according to a sub-band puncturing mechanism, which may be configured to puncture (knock-out) some frequency sub-band(s), for example, to provide a technical solution to support horning of one or more incumbents within the wide channel bandwidth, e.g., as described below.

In some demonstrative aspects, device 102, device 140 and/or device 160 may be configured to utilize the wide channel bandwidth sounding signal, for example, to provide a technical solution to support channel sounding, e.g., secure channel sounding, over relatively large channel bandwidths, e.g., a wide channel bandwidth greater than 160 MHz.

In some demonstrative aspects, the channel sounding, e.g., secure channel sounding, over the relatively large channel bandwidths, e.g., the wide channel bandwidth greater than 160 MHz, may be implemented to provide a technical solution to support wireless sensing and/or wireless ranging techniques, for example, with improved accuracy.

In some demonstrative aspects, device 102, device 140 and/or device 160 may be configured to generate, transmit, receive and/or process one or more transmissions of a Null Data Packet (NDP) over a wide channel bandwidth greater than 160 MHz, e.g., a wide channel bandwidth of at least 320 MHz, e.g., as described below.

In some demonstrative aspects, controller 124 may be configured to control, trigger, cause, and/or instruct device 102 to generate a wide bandwidth Long Training Field (LTF), which may be configured for channel sounding over a wide channel bandwidth of at least 320 MHz, e.g., as described below.

In some demonstrative aspects, the wide bandwidth LTF may include a plurality of Orthogonal Frequency Division Multiplexing (OFDM) symbols over the wide channel bandwidth, e.g., as described below.

In some demonstrative aspects, controller 124 may be configured to control, trigger, cause, and/or instruct device 102 to transmit an NDP including the wide bandwidth LTF over the wide channel bandwidth, e.g., as described below.

In some demonstrative aspects, controller 154 may be configured to control, trigger, cause, and/or instruct device 140 to process the NDP including the wide bandwidth LTF over the wide channel bandwidth.

In some demonstrative aspects, controller 154 may be configured to control, trigger, cause, and/or instruct device 140 to determine one or more sensing measurements and/or ranging measurements, for example, based on measurements on the wide bandwidth LTF in the NDP.

In some demonstrative aspects, the NDP may include a non-High-Throughput (non-HT) preamble, for example, including a non-HT Short Training Field (L-STF), a non-HT LTF (L-LTF), e.g., after the L-STF, and a non-HT Signal (L-SIG) field, for example, after the L-LTF, e.g., as described below.

In some demonstrative aspects, the NDP may include a Repeated L-SIG (RL-SIG) field, for example, after the L-SIG field, e.g., as described below.

In some demonstrative aspects, the NDP may include the wide bandwidth LTF, for example, after the RL-SIG field, e.g., as described below.

In some demonstrative aspects, the NDP may be configured based on, and/or in compliance with, a format of an EHT PPDU, for example, in accordance with an IEEE 802.11be Specification, e.g., as described below.

In some demonstrative aspects, the NDP may be configured based on, and/or in compliance with, a format of an EHT sounding NDP, for example, in accordance with an IEEE 802.11be Specification, e.g., as described below.

In some demonstrative aspects, the NDP may be configured to provide a technical solution to support security for channel sounding over the wide channel bandwidth, for example, in compliance with a format of an EHT sounding NDP, e.g., as described below.

In some demonstrative aspects, the NDP may include a Unified Signal (U-SIG) field, e.g., after the RL-SIG field, and an EHT STF (EHT-STF), for example, after the U-SIG field, e.g., as described below.

In some demonstrative aspects, the NDP may include the wide bandwidth LTF, for example, after the EHT-STF, e.g., as described below.

In some demonstrative aspects, the NDP may include an EHT Signal (EHT-SIG) field, for example, between the U-SIG field and the EHT-STF, e.g., as described below.

In some demonstrative aspects, the EHT-STF may be immediately after the U-SIG field, e.g., as described below.

In some demonstrative aspects, the NDP may be configured based on, and/or in compliance with, a format of a High-Efficiency (HE) PPDU, for example, in accordance with an IEEE 802.11ax Specification and/or an IEEE 802.11az Specification, e.g., as described below.

In some demonstrative aspects, the NDP may be configured based on, and/or in compliance with, a format of an HE secure ranging NDP, for example, in accordance with an IEEE 802.11ax Specification and/or an IEEE 802.11az Specification, e.g., as described below.

In some demonstrative aspects, the NDP may be configured to provide a technical solution to support security for channel sounding over the wide channel bandwidth in compliance with a format of HE secure ranging NDP, e.g., as described below.

In some demonstrative aspects, the NDP may include an HE Signal A (HE-SIG-A) field after the RL-SIG field, an Extended HE-STF, e.g., after the HE-SIG field, and an Extended HE-LTF, for example, after the extended HE-STF, e.g., as described below.

In some demonstrative aspects, the Extended HE-LTF may include the wide bandwidth LTF, e.g., as described below.

In some demonstrative aspects, controller 124 may be configured to control, trigger, cause, and/or instruct device 102 to duplicate the L-STF, the L-LTF, the L-SIG field, the RL-SIG field, and the HE-SIG-A field, for example, over a plurality of 20 MHz channel widths forming the wide channel bandwidth, e.g., as described below.

In some demonstrative aspects, the extended HE-STF may include an HE-STF sequence, which may be repeated, e.g., with phase rotation, for example, over a plurality of 160 MHz channel widths forming the wide channel bandwidth, e.g., as described below.

In some demonstrative aspects, the wide bandwidth LTF may include a secure wide bandwidth LTF, e.g., as described below.

In some demonstrative aspects, an OFDM symbol of the plurality of OFDM symbols of the secure wide bandwidth LTF may include a plurality of encrypted Quadrature Amplitude Modulation (QAM) symbols over a plurality of subcarriers, e.g., as described below.

In some demonstrative aspects, the plurality of encrypted QAM symbols may include a plurality of encrypted 64-QAM symbols.

In some demonstrative aspects, the plurality of encrypted QAM symbols may include a plurality of encrypted 16-QAM symbols.

In some demonstrative aspects, the plurality of encrypted QAM symbols may include a plurality of encrypted 256-QAM symbols.

In other aspects, and other QAM scheme may be implemented.

In some demonstrative aspects, the secure wide bandwidth LTF may include a zero-power guard interval, e.g., as described below.

Figure 2:
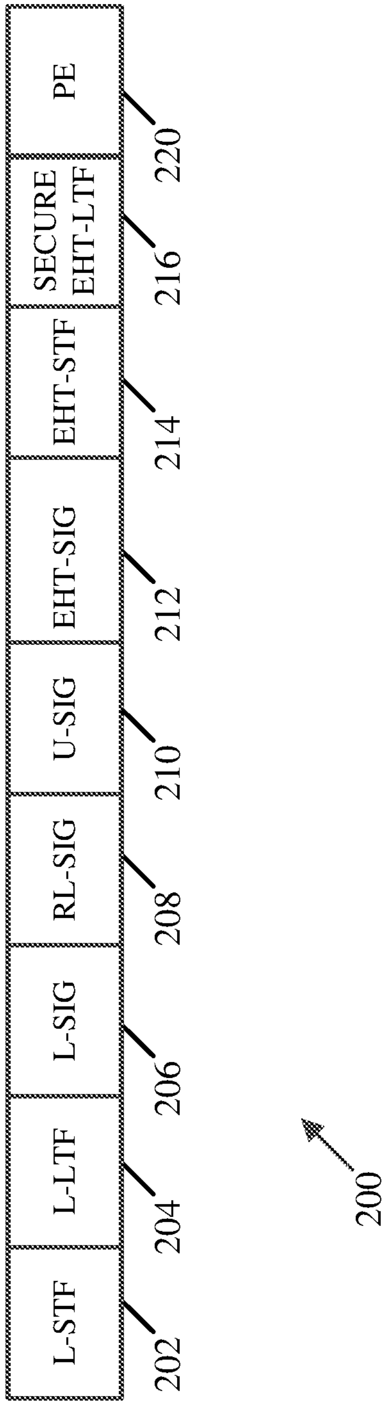
FIG. 2 is a schematic illustration of a Null Data Packet (NDP) format, in accordance with some demonstrative aspects.

Reference is made to FIG. 2, which schematically illustrates an NDP format 200, which may be implemented in accordance with some demonstrative aspects. In one example, devices 102 (FIG. 1), 140 (FIG. 1), and/or 160 (FIG. 1) may be configured to generate, transmit, receive and/or process one or more NDPs having the structure and/or format of NDP 200.

In some demonstrative aspects, devices 102 (FIG. 1), 140 (FIG. 1), and/or 160 (FIG. 1) may communicate NDP 200, for example, as part of a transmission over a wide channel bandwidth greater than 160 MHz, for example, a wide channel bandwidth of at least 320 MHz, e.g., as described below.

In some demonstrative aspects, the wide channel bandwidth may include, or may be formed of, a plurality of sub-channels, e.g., 20 MHz sub-channels, 40 MHz sub-channels, 80 MHz sub-channels, 160 MHz sub-channels, and/or any other additional or alternative sub-channels, e.g., as described below.

In some demonstrative aspects, NDP 200 may be configured, for example, in compliance with a format of an EHT MU PPDU and/or an EHT TB PPDU.

In some demonstrative aspects, as shown in FIG. 2, NDP 200 may include a non-High Throughput (non-HT) (legacy) Short Training Field (STF) (L-STF) 202, followed by a non-HT (Legacy) Long Training Field (LTF) (L-LTF) 204, which may be followed by a non-HT Signal (SIG) (L-SIG) field 206.

In some demonstrative aspects, as shown in FIG. 2, NDP 200 may include a repeated non-HT SIG (RL-SIG) field 208, which may follow the L-SIG field 206. The RL-SIG field 208 may be followed by a Universal SIG (U-SIG) field 210.

In some demonstrative aspects, as shown in FIG. 2, NDP 200 may include a plurality of EHT-modulated fields, e.g., following the U-SIG field 210.

In some demonstrative aspects, as shown in FIG. 2, the EHT modulated fields may include, for example, an EHT Signal (EHT-SIG) field 212.

In some demonstrative aspects, as shown in FIG. 2, the EHT modulated fields may include, for example, an EHT STF (EHT-STF) field 214, e.g., following the EHT-SIG field 212.

In some demonstrative aspects, as shown in FIG. 2, NDP 200 may include, for example, a wide channel bandwidth EHT-LTF 216, e.g., a secure wide channel bandwidth EHT-LTF field 216, for example, following the EHT-STF field 214, e.g., as described below.

In some demonstrative aspects, as shown in FIG. 2, NDP 200 may include, for example, a Packet Extension (PE) field 220, e.g., following the wide channel bandwidth EHT-LTF field 216.

In some demonstrative aspects, as shown in FIG. 2, the secure wide channel bandwidth EHT-LTF 216 may be configured to implement security to an EHT-LTF format, e.g., as described below.

In some demonstrative aspects, secure wide channel bandwidth EHT-LTF 216 may include OFDM symbols. For example, an OFDM symbol, e.g., each OFDM symbol, may be configured to carry encrypted QAM symbols over a plurality of active subcarriers, e.g., as described below.

In some demonstrative aspects, secure wide channel bandwidth EHT-LTF 216 may be configured, for example, without a conventional cyclic prefix.

Figure 3:
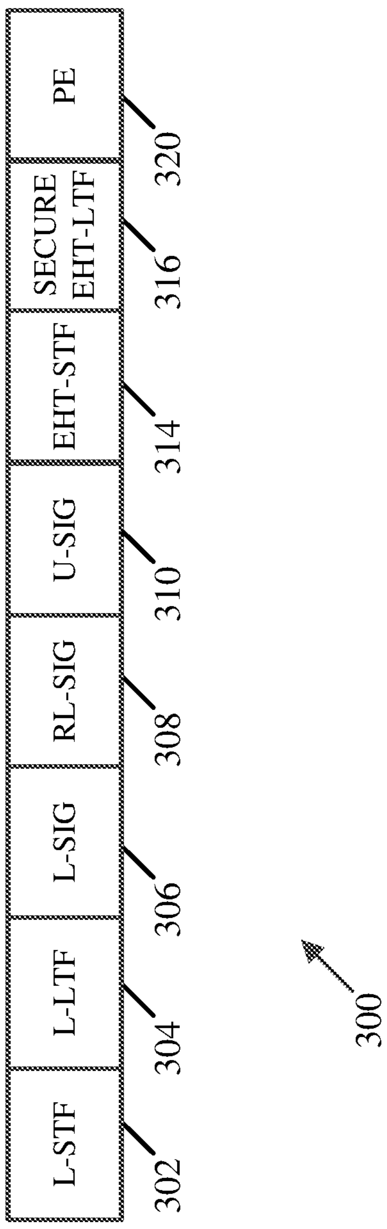
FIG. 3 is a schematic illustration of an NDP format, in accordance with some demonstrative aspects.

Reference is made to FIG. 3, which schematically illustrates an NDP format 300, which may be implemented in accordance with some demonstrative aspects. In one example, devices 102 (FIG. 1), 140 (FIG. 1), and/or 160 (FIG. 1) may be configured to generate, transmit, receive and/or process one or more NDPs having the structure and/or format of NDP 300.

In some demonstrative aspects, devices 102 (FIG. 1), 140 (FIG. 1), and/or 160 (FIG. 1) may communicate NDP 300, for example, as part of a transmission over a wide channel bandwidth greater than 160 MHz, for example, a wide channel bandwidth of at least 320 MHz, e.g., as described below.

In some demonstrative aspects, the wide channel bandwidth may include, or may be formed of, a plurality of sub-channels, e.g., 20 MHz sub-channels, 40 MHz sub-channels, 80 MHz sub-channels, 160 MHz sub-channels, and/or any other additional or alternative sub-channels, e.g., as described below.

In some demonstrative aspects, NDP 300 may be configured, for example, in compliance with a format of an EHT MU PPDU and/or an EHT TB PPDU.

In some demonstrative aspects, as shown in FIG. 3, NDP 300 may be configured to exclude an EHT-SIG field, e.g., EHT-SIG field 212 (FIG. 2). For example, the EHT-SIG field may be excluded from NDP 300 to provide a technical solution to reduce an overhead of NDP 300. For example, bandwidth allocation information in the EHT-SIG may not be required, for example, when using the NDP 300 for performing ranging and/or sensing over a full bandwidth, e.g., for high accuracy.

In some demonstrative aspects, as shown in FIG. 3, NDP 300 may include an L-STF 302, followed by an L-LTF 304, which may be followed by an L-SIG field 306.

In some demonstrative aspects, as shown in FIG. 3, NDP 300 may include an RL-SIG field 308, which may follow the L-SIG field 306. The RL-SIG field 308 may be followed by a U-SIG field 310.

In some demonstrative aspects, as shown in FIG. 3, NDP 300 may include an EHT-STF field 314, e.g., immediately after the U-SIG field 310.

In some demonstrative aspects, as shown in FIG. 3, NDP 300 may include, for example, a wide channel bandwidth EHT-LTF 316, e.g., a secure wide channel bandwidth EHT-LTF field 316, for example, following the EHT-STF field 314, e.g., as described below.

In some demonstrative aspects, as shown in FIG. 3, NDP 300 may include, for example, a PE field 320, e.g., following the wide channel bandwidth EHT-LTF field 316.

Figure 4:
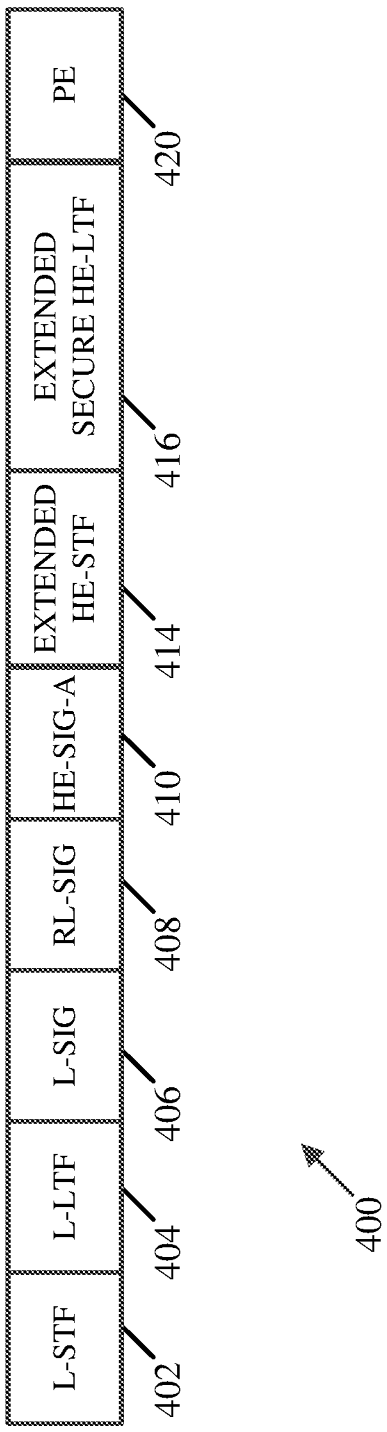
FIG. 4 is a schematic illustration of an NDP format, in accordance with some demonstrative aspects.

Reference is made to FIG. 4, which schematically illustrates an NDP format 400, which may be implemented in accordance with some demonstrative aspects. In one example, devices 102 (FIG. 1), 140 (FIG. 1), and/or 160 (FIG. 1) may be configured to generate, transmit, receive and/or process one or more NDPs having the structure and/or format of NDP 400.

In some demonstrative aspects, devices 102 (FIG. 1), 140 (FIG. 1), and/or 160 (FIG. 1) may communicate NDP 400, for example, as part of a transmission over a wide channel bandwidth greater than 160 MHz, for example, a wide channel bandwidth of at least 320 MHz, e.g., as described below.

In some demonstrative aspects, the wide channel bandwidth may include, or may be formed of, a plurality of sub-channels, e.g., 20 MHz sub-channels, 40 MHz sub-channels, 80 MHz sub-channels, 160 MHz sub-channels, and/or any other additional or alternative sub-channels, e.g., as described below.

In some demonstrative aspects, NDP 400 may be configured, for example, to extend a secure NDP format, for example, in compliance with an IEEE 802.11az Specification.

In some demonstrative aspects, as shown in FIG. 4, NDP 400 may include an L-STF 402, followed by an L-LTF 404, which may be followed by an L-SIG field 406.

In some demonstrative aspects, as shown in FIG. 4, NDP 400 may include an RL-SIG field 408, which may follow the L-SIG field 406.

In some demonstrative aspects, as shown in FIG. 4, NDP 400 may include an HE-SIG-A field 410, e.g., following the RL-SIG field 408.

In some demonstrative aspects, as shown in FIG. 4, NDP 400 may include an Extended HE-STF field 414, e.g., following the HE-SIG-A field 410.

In some demonstrative aspects, as shown in FIG. 4, NDP 400 may include, for example, a wide channel bandwidth (extended) HE-LTF 416, e.g., an extended secure HE-LTF field 416, for example, following the extended HE-STF field 414, e.g., as described below.

In some demonstrative aspects, as shown in FIG. 4, NDP 400 may include, for example, a PE field 420, e.g., following the extended HE-LTF field 416.

In some demonstrative aspects, L-STF 402, L-LTF 404, L-SIG field 406, RL-SIG field 408, and/or HE-SIG-A field 410 may be configured over a bandwidth of 20 MHz.

In some demonstrative aspects, L-STF 402, L-LTF 404, L-SIG field 406, RL-SIG field 408, and/or HE-SIG-A field 410 may be repeated, e.g., according to a duplicated transmission mode, for more than 8 times over more than 8 respective 20 MHz sub-channels forming the wide channel bandwidth.

For example, in case the wide channel bandwidth includes a 320 MHz channel bandwidth, L-STF 402, L-LTF 404, L-SIG field 406, RL-SIG field 408, and/or HE-SIG-A field 410 may be repeated over 16 20 MHz sub-channels forming the 320 MHz channel bandwidth.

For example, controller 124 may be configured to control, trigger, cause, and/or instruct device 102 to transmit L-STF 402, L-LTF 404, L-SIG field 406, RL-SIG field 408, and/or HE-SIG-A field 410 duplicated over 16 20 MHz sub-channels forming the 320 MHz channel bandwidth.

For example, in case the wide channel bandwidth includes a channel bandwidth greater than 320 MHz, L-STF 402, L-LTF 404, L-SIG field 406, RL-SIG field 408, and/or HE-SIG-A field 410 may be repeated over more than 16 20 MHz sub-channels forming a channel bandwidth greater than 320 MHz.

In some demonstrative aspects, a different phase rotation may be applied to the repeated 20 MHz signal, e.g., to each repetition of the L-STF 402, L-LTF 404, L-SIG field 406, RL-SIG field 408, and/or HE-SIG-A field 410, for example, to reduce a Peak to Average Power Ratio (PAPR) of the sounding signal.

In some demonstrative aspects, the extended HE-STF field 414 may be configured to support the wide channel bandwidth. For example, the extended HE-STF 414 may be configured to include an extended HE-STF sequence in a frequency domain, for example, in compliance with an HE-STF sequence, e.g., according to an IEEE 802.11ax Specification.

In some demonstrative aspects, the extended HE-STF field 414 may be configured to repeat a 160 MHz HE-STF sequence over a plurality of 160 MHz channel widths forming the wide channel bandwidth. In one example, the extended HE-STF field 414 may be configured to repeat a 160 MHz HE-STF sequence over two 160 MHz channel widths forming a 320 MHz channel bandwidth.

In some demonstrative aspects, a phase rotation, e.g., −1 or any other phase rotation, may be applied to the repeated 160 MHz HE-STF sequence, for example, to reduce PAPR.

In some demonstrative aspects, the extended HE-STF field 414 may be configured to include an extended HE-STF sequence, which may be constructed, for example, based om an M sequence, e.g., in accordance with an IEEE 802.11ax Specification; a padding, e.g., of 0, 1, and −1; and/or a phase rotation, e.g., −1.

For one example, the extended HE-STF sequence for a 320 MHz bandwidth may have a structure based on $\{S_{160MHz}, 0, C_{160MHz}\}$, wherein $S_{160MHz}$ includes an HE-STF sequence for a first 160 MHz channel width, and $C_{160MHz}$ includes an extended sequence part for an additional 160 MHz channel width.

For example, the extended sequence part $C_{160MHz}$ may be configured to have a structure $\{p_1M, p_2, p_3M, 0, p_4M, p_5, p_6M, 0, p_7M, p_8, p_9M, 0, p_{10}M, p_{11}, p_{12}M\}$. For example, M may be defined as $M=\{-1, -1, -1, 1, 1, 1, -1, 1, 1, 1, -1, 1, 1, -1, 1\}$, e.g., in accordance with an M sequence for an HE-STF, e.g., in accordance with an IEEE 802.11ax Specification. For example, $p_k \in \{1, -1\}$ may include the phase rotations.

In one example, a full 320 MHz sequence with phase rotations may be defined as $\{S_{160MHz}, 0, C_{160MHz}\}=(1+j)/\sqrt{2}\{[M, 1, -M, 0, -M, 1, -M, 0, -M, -1, M, 0, -M, 1, -M], 0, [-M, -1, M, 0, M, -1, M, 0, -M, -1, M, 0, -M, 1, -M]\}$. For example, this sequence may be constructed in accordance with a non-trigger based HE-STF sequence.

In another example, an extended HE-STF sequence may be constructed, for example, in accordance with a trigger-based HE-STF sequence, which may have a length that is twice of the non-trigger based one. For example, the phase-rotated M sequence and the 0/1/−1 padding may be utilized to generate the extended HE-STF sequence.

In some demonstrative aspects, the extended HE-STF field 414 may be configured to include an EHT-STF sequence, e.g., similar to EHT-STF 214 (FIG. 2), for example, an EHT-STF sequence defined in accordance with an IEEE 802.11be Specification.

Referring back to FIG. 1, in some demonstrative aspects devices 102, 140 and/or 160 may be configured to communicate an NDP including the wide bandwidth LTF, e.g., NDP 200 (FIG. 2), NDP 300 (FIG. 3) and/or NDP 400 (FIG. 4), over a wide channel bandwidth of at least 320 MHz, which may be configured to exclude (puncture) one or more punctured sub-bands of the wide channel bandwidth, e.g., as described below.

In some demonstrative aspects, an available bandwidth in the wide channel bandwidth may be less than 320 MHz, for example, since some sub-band(s) may be punctured, for example, for use by incumbent radios, and/or some sub-band(s) may be occupied by another device.

In some demonstrative aspects, a STA transmitting an NDP including the wide bandwidth LTF, e.g., a STA implemented by device 102, device 140, and/or device 160, may be configured to generate one or more fields of the NDP, for example, such that the one or more fields of the NDP may not fully cover the wide bandwidth of at least 320 MHz, e.g., as described below.

In one example, the STA may be configured to generate one or more fields of the NDP only over part of the wide bandwidth of at least 320 MHz, e.g., as described below.

In another example, the STA may be configured to generate one or more fields of the NDP over the wide bandwidth of at least 320 MHz, and to remover some part of the generated fields, e.g., as described below.

In some demonstrative aspects, the STA transmitting the NDP including the wide bandwidth LTF, e.g., the STA implemented by device 102, device 140, and/or device 160, may be configured to generate an STF sequence of the NDP, for example, such that the STF sequence may not fully cover the wide bandwidth of at least 320 MHz, e.g., as described below.

For example, the STA transmitting the NDP including the wide bandwidth LTF over a wide bandwidth of 320 MHz may not generate the full STF sequence for 320 MHz, and/or some part of the generated STF sequence may be removed, for example, for the incumbent radio and/or the occupied sub-band before the transmission, e.g., as described below.

In one example, the STA may be configured to generate the STF sequence of the NDP only over part of the wide bandwidth of at least 320 MHz, e.g., as described below.

In another example, the STA may be configured to generate the STF sequence of the NDP over the wide bandwidth of at least 320 MHz, and to remover some part of the generated fields, e.g., as described below.

In some demonstrative aspects, the STA transmitting the NDP including the wide bandwidth LTF, e.g., the STA implemented by device 102, device 140, and/or device 160, may include an STF sequence generator to generate the STF sequence. For example, the STF sequence generator may be followed by a puncturer, e.g., a sub-band puncturer, which may be configured to remove (puncture) an STF signal component over one or more punctured sub-bands, e.g., on the incumbent radio band and the occupied sub-band.

In some demonstrative aspects, the STA transmitting the NDP including the wide bandwidth LTF, e.g., the STA implemented by device 102, device 140, and/or device 160, may be configured to generate the wide bandwidth LTF of the NDP, for example, such that the STF sequence may not fully cover the wide bandwidth of at least 320 MHz, e.g., as described below.

For example, the STA transmitting the NDP including the wide bandwidth LTF over a wide bandwidth of 320 MHz may not generate the full LTF sequence for 320 MHz, and/or some part of the generated LTF sequence may be removed, for example, for the incumbent radio and/or the occupied sub-band before the transmission, e.g., as described below.

In one example, the STA may be configured to generate the wide bandwidth LTF of the NDP only over part of the wide bandwidth of at least 320 MHz, e.g., as described below.

In another example, the STA may be configured to generate the wide bandwidth LTF of the NDP over the wide bandwidth of at least 320 MHz, and to remover some part of the generated fields, e.g., as described below.

In some demonstrative aspects, the STA transmitting the NDP including the wide bandwidth LTF, e.g., the STA implemented by device 102, device 140, and/or device 160, may include an LTF generator to generate an LTF signal. For example, the LTF generator may be followed by a puncturer, e.g., a sub-band puncturer, which may be configured to remove (puncture) an LTF signal component over one or more punctured sub-bands, e.g., on the incumbent radio band and the occupied sub-band.

In some demonstrative aspects, the STA transmitting the NDP including the wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), to include secure LTF symbols, e.g., as described below.

In some demonstrative aspects, the secure LTF symbols may include OFDM symbols, e.g., as described below.

In some demonstrative aspects, an OFDM symbol of the secure LTF symbols, e.g., each OFDM symbol, may be configured to carry a sequence of QAM symbols in a frequency domain, e.g., as described below.

In some demonstrative aspects, the QAM symbols may be configured according to a 64 QAM constellation, for example, to provide a technical solution to reuse a 64 QAM constellation, e.g., in compliance with an IEEE 802.11az Specification.

In some demonstrative aspects, the QAM symbols may be configured according to a 16 QAM constellation, for example, to provide a technical solution to support an implementation with reduced complexity.

In some demonstrative aspects, the QAM symbols may be configured according to a 256 QAM constellation, for example, to provide a technical solution to support improved security.

In other aspects, any other QAM constellation may be implemented.

In some demonstrative aspects, the OFDM symbols of the secure LTF symbols may be configured without a cyclic prefix (CP), for example, to provide a technical solution to avoid and/or prevent CP-replay attacks.

In some demonstrative aspects, the STA transmitting the NDP including the wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), to include a zero-power guard interval, e.g., instead of CP.

In some demonstrative aspects, the STA transmitting the NDP including the wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), to include a secure LTF sequence, for example, to support secure sounding, e.g., as described below.

the STA transmitting the NDP including the wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), for example, by generating secure QAM symbols for active subcarriers in the secure LTF symbols, e.g., as described below.

In some demonstrative aspects, the STA transmitting the NDP including the wide bandwidth LTF, e.g., the STA implemented by device 102, device 140, and/or device 160, may be configured to generate the secure QAM symbols for the active subcarriers in the secure LTF symbols according to one or more secure LTF sequence generation schemes, e.g., as described below.

In some demonstrative aspects, a secure LTF sequence generation scheme may be configured to generate a sounding signal as an OFDM symbol for a transmit antenna, e.g., as described below.

In some demonstrative aspects, subcarriers of the OFDM symbol may be configured to carry pseudo random QAM symbols, respectively, e.g., as described below.

In some demonstrative aspects, controller 124 may be configured to control, trigger, cause, and/or instruct device 102 to generate an NDP including a wide bandwidth LTF, and to puncture the wide bandwidth LTF over one or more punctured sub-bands in the wide channel bandwidth, for example, according to a first secure LTF sequence generation scheme, e.g., as described below.

In some demonstrative aspects, for example, according to the first secure LTF sequence generation scheme, controller 124 may include a segment parser configured to parse a stream of encryption bytes into at least three streams, e.g., as described below.

In some demonstrative aspects, for example, according to the first secure LTF sequence generation scheme, controller 124 may include a QAM modulator configured to generate at least three QAM symbol streams by modulating the at least three streams according to a QAM scheme, e.g., as described below.

In some demonstrative aspects, for example, according to the first secure LTF sequence generation scheme, controller 124 may include a QAM symbol mapper configured to map QAM symbols of the at least three QAM symbol streams to sub-carriers of at least three respective sub-bands in the wide channel bandwidth, e.g., as described below.

In some demonstrative aspects, the at least three sub-bands may include sub-bands based on an 80 MHz sub-band unit. For example, a sub-band may be 80 MHz or another integer multiple of 80 Mhz. In other aspects, any other sub-band unit and/or width may be used.

In some demonstrative aspects, for example, according to the first secure LTF sequence generation scheme, controller 124 may include a sub-band puncturer configured to remove QAM symbols mapped to the one or more punctured sub-bands, e.g., as described below.

In some demonstrative aspects, the one or more punctured sub-bands may include punctured sub-bands based on a 20 MHz punctured sub-band unit. For example, a punctured sub-band may be 20 MHz or another integer multiple of 80 Mhz. In other aspects, any other punctured sub-band unit and/or width may be used.

In some demonstrative aspects, controller 124 may be configured to control, trigger, cause, and/or instruct device 102 to generate an NDP including a wide bandwidth LTF, and to puncture the wide bandwidth LTF over one or more punctured sub-bands in the wide channel bandwidth, for example, according to a second secure LTF sequence generation scheme, e.g., as described below.

In some demonstrative aspects, for example, according to the second secure LTF sequence generation scheme, controller 124 may include a segment parser configured to parse a stream of encryption bytes into at least three streams based on the one or more punctured sub-bands, e.g., as described below.

In some demonstrative aspects, for example, according to the second secure LTF sequence generation scheme, controller 124 may include a QAM modulator configured to generate at least three QAM symbol streams by modulating the at least three streams according to a QAM scheme, e.g., as described below.

In some demonstrative aspects, for example, according to the second secure LTF sequence generation scheme, controller 124 may include a QAM symbol mapper configured to map QAM symbols of the at least three QAM symbol streams to sub-carriers of at least three respective sub-bands in the wide channel bandwidth based on the one or more punctured sub-bands, e.g., as described below.

In some demonstrative aspects, the at least three sub-bands may include sub-bands based on an 80 MHz sub-band unit. For example, a sub-band may be 80 MHz or another integer multiple of 80 Mhz. In other aspects, any other sub-band unit and/or width may be used.

In some demonstrative aspects, the one or more punctured sub-bands may include punctured sub-bands based on a 20 MHz punctured sub-band unit. For example, a punctured sub-band may be 20 MHz or another integer multiple of 80 Mhz. In other aspects, any other punctured sub-band unit and/or width may be used.

In some demonstrative aspects, controller 124 may be configured to control, trigger, cause, and/or instruct device 102 to generate an NDP including a wide bandwidth LTF, and to puncture the wide bandwidth LTF over one or more punctured sub-bands in the wide channel bandwidth, for example, according to a third secure LTF sequence generation scheme, e.g., as described below.

In some demonstrative aspects, for example, according to the third secure LTF sequence generation scheme, controller 124 may include a segment parser configured to parse a stream of encryption bytes into a plurality of streams, e.g., as described below.

In some demonstrative aspects, for example, according to the third secure LTF sequence generation scheme, controller 124 may include a QAM modulator configured to generate a plurality of QAM symbol streams by modulating the plurality of streams according to a QAM scheme, e.g., as described below.

In some demonstrative aspects, for example, according to the third secure LTF sequence generation scheme, controller 124 may include a QAM symbol mapper configured to map QAM symbols of the plurality of QAM symbol streams to a sounding signal over sub-carriers of a plurality of respective sub-bands in a first part of the wide channel bandwidth, e.g., as described below.

In some demonstrative aspects, for example, according to the third secure LTF sequence generation scheme, controller 124 may include a duplicator configured to duplicate the sounding signal, with phase rotation, over sub-carriers of a plurality of respective sub-bands in a second part of the wide channel bandwidth, e.g., as described below.

In some demonstrative aspects, for example, according to the third secure LTF sequence generation scheme, controller 124 may include a sub-band puncturer configured to remove QAM symbols mapped to the one or more punctured sub-bands, e.g., as described below.

Figure 5:
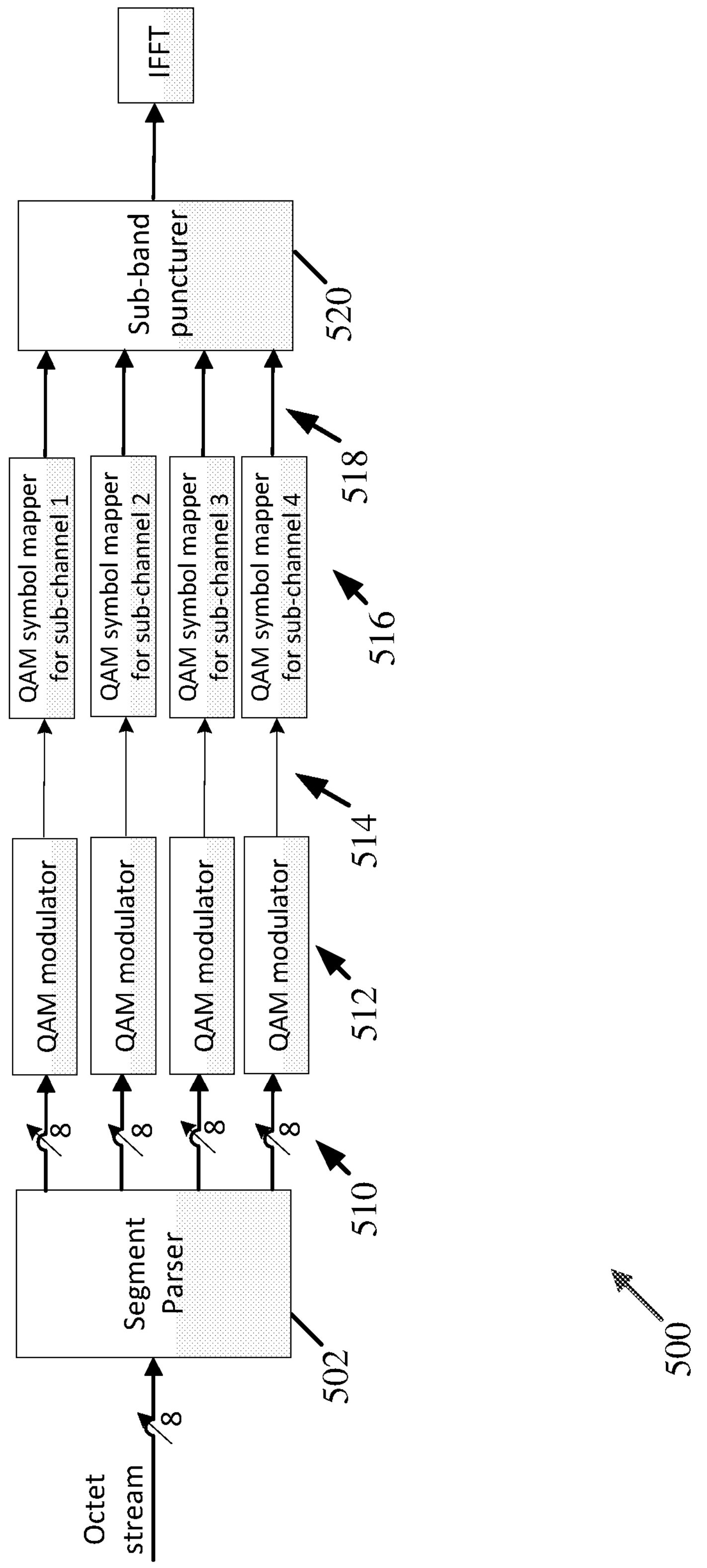
FIG. 5 is a schematic illustration of a secure wide bandwidth Long Training Field (LTF) generator, in accordance with some demonstrative aspects.

Reference is made to FIG. 5, which schematically illustrates a secure wide bandwidth LTF generator 500, in accordance with some demonstrative aspects. For example, device 102 (FIG. 1) may be configured to implement one or more elements of secure wide bandwidth LTF generator 500, and/or to perform one or more functionalities of secure wide bandwidth LTF generator 500.

In some demonstrative aspects, secure wide bandwidth LTF generator 500 may be configured to generate a secure wide bandwidth LTF over a wide channel bandwidth, for example, according to the first secure LTF sequence generation scheme, e.g., as described below.

In some demonstrative aspects, secure wide bandwidth LTF generator 500 may be configured to generate the secure wide bandwidth LTF, for example, based on an increased number of output streams at a segment parser 502, e.g., as described below.

In some demonstrative aspects, segment parser 502 may be configured to distribute encryption bytes to a plurality of streams, which may be utilized to generate a respective plurality of sounding signals. For example, a stream may be utilized to generate a 80 MHz sounding signal over an 80 MHz channel in the wide channel bandwidth.

In some demonstrative aspects, the plurality of streams may include more than two streams, for example, to support a wide channel bandwidth greater than 160 MHz.

In some demonstrative aspects, the plurality of streams may include at least three streams.

In some demonstrative aspects, the plurality of streams may include four streams, for example, to be used to generate four respective 80 MHz sounding signals over four respective 80 MHz channels of a 320 MHz wide channel bandwidth.

In other aspects, any other count of streams may be utilized to generate sounding signals over a plurality of channels, e.g., 80 MHz channels and/or channels of any other channel widths, in a wide channel bandwidth of 320 MHz, and/or any other wide channel bandwidth greater than 160 MHz.

In some demonstrative aspects, as shown in FIG. 5, segment parser 502 may be configured to distribute the encryption bytes or bits to four streams 510, respectively.

In one example, segment parser 502 may be configured to finish sending bytes or bits to one stream first, and then to the next stream.

In another example, segment parser 502 may be configured to send bytes or bits to the streams 510 in a round robin fashion. For example, the byte or bit distribution can be segment-by-segment, byte-by-byte, or bit-by-bit.

In one example, a first byte or bit may be sent to a first stream, a second byte or bit may be sent to a second stream, and so on, for example, such that a fifth byte or bit may be sent to the first stream again.

In another example, a first group of bytes, e.g., the first 996 bytes, may be sent to the first stream, a second group of bytes, e.g., the second 996 bytes, may be sent to the second stream, and so on.

In other aspects, segment parser 502 may be configured to distribute the encryption bytes/bits to the streams 510 according to any other additional or alternative distribution scheme.

In some demonstrative aspects, secure wide bandwidth LTF generator 500 may include a QAM modulator 512, which may be configured to generate QAM symbols, e.g., for each stream 510.

In some demonstrative aspects, QAM modulator 512 may include a 64 QAM modulator to generate the QAM symbols according to a 64 QAM constellation scheme, e.g., in compliance with an IEEE 802.11az Specification.

In some demonstrative aspects, QAM modulator 512 may include a 256 QAM modulator to generate the QAM symbols according to a 256 QAM constellation scheme, e.g., to support higher security.

In some demonstrative aspects, QAM modulator 512 may include a 16 QAM modulator to generate the QAM symbols according to a 16 QAM constellation scheme, e.g., to support reduced complexity.

In other aspects, any other QAM constellation scheme may be used.

For example, for the ease of implementation, each byte (or each two bytes) may only indicate one constellation point in the QAM constellation. For example, some bit(s) of the byte may not be used.

In some demonstrative aspects, as shown in FIG. 5, a QAM symbol stream 514 generated by the QAM modulator 512 may be sent to a symbol mapper 516.

In some demonstrative aspects, symbol mapper 516 may be configured to map the QAM symbols to subcarriers of a sub-channel 518.

In some demonstrative aspects, sub-channel 518 may have a bandwidth of 80 MHz, e.g., in compliance with an IEEE 802.11az Specification.

In some demonstrative aspects, sub-channel 518 may have a bandwidth of 20 MHz and/or any other bandwidth.

In some demonstrative aspects, as shown in FIG. 5, secure wide bandwidth LTF generator 500 may include a sub-band puncturer 520, which may be configured to puncture the QAM symbols mapped to the sub-channels 518 by the QAM symbol mappers 516.

In some demonstrative aspects, sub-band puncturer 520 may be configured to puncture QAM symbols over sub-bands, which may not be available. For example, in a 6 GHz band, there may be some incumbents, e.g., fixed wireless links and/or satellite links, which may be honored by WiFi transmissions. Accordingly, the sounding signal on some sub-band(s) may be removed. For example, the sub-band puncturer 520 may be configured to remove the QAM symbols that were mapped to the sub-band(s) overlapping with the incumbent band(s).

For example, for the ease of implementation, the width of the sub-band may be a multiple of a unit bandwidth such as, for example, 20 MHz, 10 MHz, or 80 MHz.

In some demonstrative aspects, as shown in FIG. 5, secure wide bandwidth LTF generator 500 may include a frequency-domain to time-domain converter, e.g., an Inverse Fast Fourier Transform (IFFT) or a Fast Fourier Transform (FFT) applier.

Figure 6:
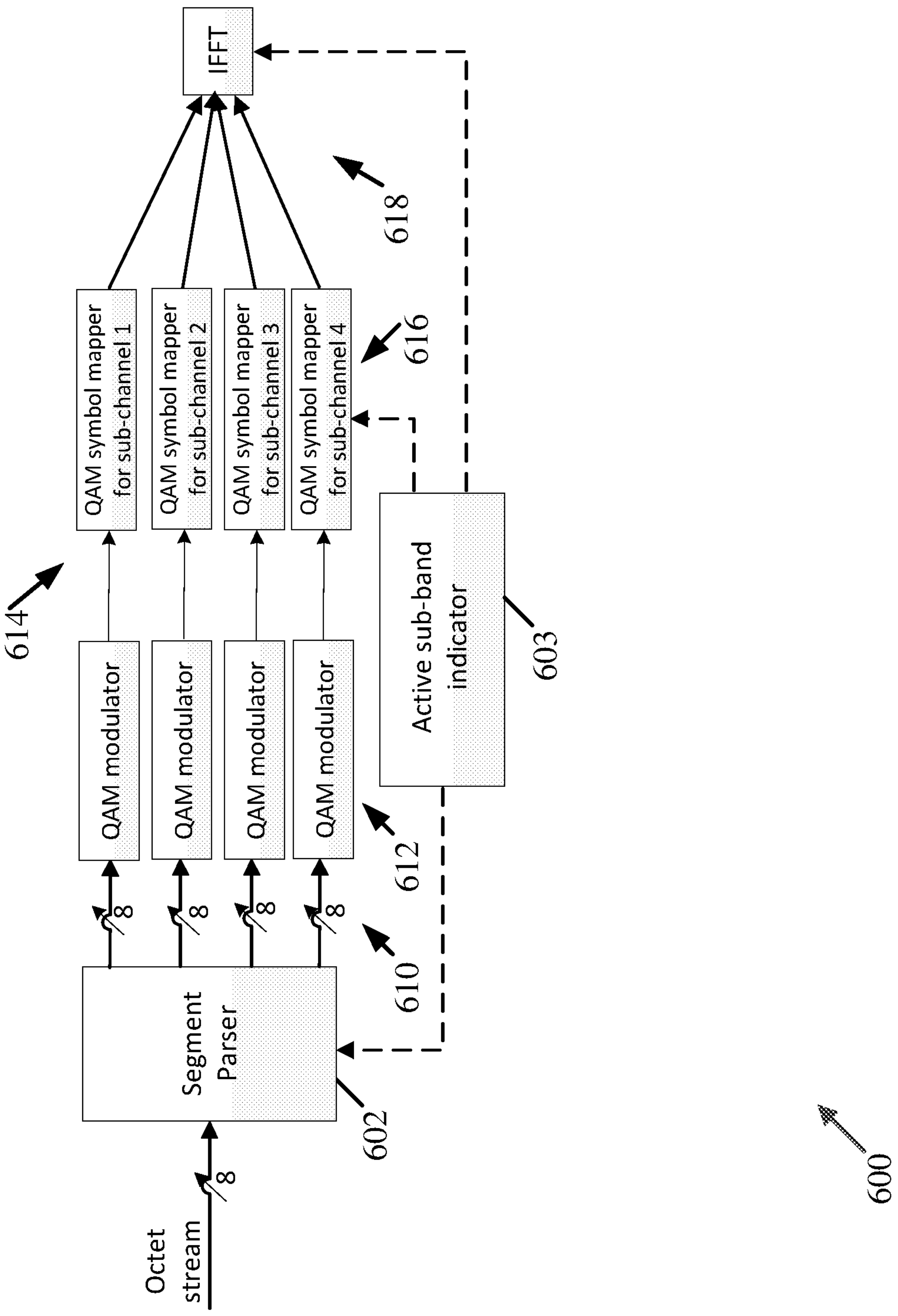
FIG. 6 is a schematic illustration of a secure wide bandwidth LTF generator, in accordance with some demonstrative aspects.

Reference is made to FIG. 6, which schematically illustrates a secure wide bandwidth LTF generator 600, in accordance with some demonstrative aspects. For example, device 102 (FIG. 1) may be configured to implement one or more elements of secure wide bandwidth LTF generator 600, and/or to perform one or more functionalities of secure wide bandwidth LTF generator 600.

In some demonstrative aspects, secure wide bandwidth LTF generator 600 may be configured to generate a secure wide bandwidth LTF over a wide channel bandwidth, for example, according to the second secure LTF sequence generation scheme, e.g., as described below.

In some demonstrative aspects, secure wide bandwidth LTF generator 600 may be configured to generate the secure wide bandwidth LTF, for example, based on an increased number of output streams at a segment parser 602, e.g., as described below.

In some demonstrative aspects, segment parser 602 may be configured to distribute encryption bytes to a plurality of streams, which may be utilized to generate a respective plurality of sounding signals. For example, a stream may be utilized to generate a 80 MHz sounding signal over an 80 MHz channel in the wide channel bandwidth.

In some demonstrative aspects, the plurality of streams may include more than two streams, for example, to support a wide channel bandwidth greater than 160 MHz.

In some demonstrative aspects, the plurality of streams may include at least three streams.

In some demonstrative aspects, the plurality of streams may include four streams, for example, to be used to generate four respective 80 MHz sounding signals over four respective 80 MHz channels of a 320 MHz wide channel bandwidth.

In other aspects, any other count of streams may be utilized to generate sounding signals over a plurality of channels, e.g., 80 MHz channels and/or channels of any other channel widths, in a wide channel bandwidth of 320 MHz, and/or any other wide channel bandwidth greater than 160 MHz.

In some demonstrative aspects, as shown in FIG. 6, segment parser 602 may be configured to distribute the encryption bytes or bits to four streams 610, respectively.

In some demonstrative aspects, secure wide bandwidth LTF generator 600 may include a QAM modulator 612, which may be configured to generate QAM symbols, e.g., for each stream 610.

In some demonstrative aspects, QAM modulator 612 may include a 64 QAM modulator to generate the QAM symbols according to a 64 QAM constellation scheme, e.g., in compliance with an IEEE 802.11az Specification.

In some demonstrative aspects, QAM modulator 612 may include a 256 QAM modulator to generate the QAM symbols according to a 256 QAM constellation scheme, e.g., to support higher security.

In some demonstrative aspects, QAM modulator 612 may include a 16 QAM modulator to generate the QAM symbols according to a 16 QAM constellation scheme, e.g., to support reduced complexity.

In other aspects, any other QAM constellation scheme may be used.

For example, for the ease of implementation, each byte (or each two bytes) may only indicate one constellation point in the QAM constellation. For example, some bit(s) of the byte may not be used.

In some demonstrative aspects, as shown in FIG. 6, a QAM symbol stream 614 generated by the QAM modulator 612 may be sent to a symbol mapper 616.

In some demonstrative aspects, symbol mapper 616 may be configured to map the QAM symbols to subcarriers of a sub-channel 618.

In some demonstrative aspects, sub-channel 618 may have a bandwidth of 80 MHz, e.g., in compliance with an IEEE 802.11az Specification.

In some demonstrative aspects, sub-channel 618 may have a bandwidth of 20 MHz and/or any other bandwidth.

In some demonstrative aspects, secure wide bandwidth LTF generator 600 may be configured to selectively generate the secure sounding signal of the wide bandwidth LTF, for example, over active (or usable) sub-bands of the wide channel bandwidth.

In some demonstrative aspects, secure wide bandwidth LTF generator 600 may be configured to selectively generate the secure sounding signal of the wide bandwidth LTF, for example, over only the active (or usable) sub-bands of the wide channel bandwidth, for example, instead of generating the full-bandwidth sounding signal and then puncturing part of it as described above.

In some demonstrative aspects, secure wide bandwidth LTF generator 600 may be configured to provide a technical solution to avoid "wasted" encryption bytes, which may be wasted, for example, in case the encryption bytes and QAM modulation operations are performed over sub-bands, and then some of the sub-bands are punctured out.

In some demonstrative aspects, as shown in FIG. 6, the segment parser 602 may be configured to distribute the encryption bytes or bits, for example, according to the number of active sub-bands or active subcarriers in each stream. For example, information indicating the active sub-bands may be provided by an active sub-band indicator 603.

In one example, segment parser 602 may be configured to finish sending bytes or bits to one stream first, and then to the next stream.

In another example, segment parser 602 may be configured to send bytes or bits to the streams 610 in a round robin fashion. For example, the byte or bit distribution can be segment-by-segment, byte-by-byte, or bit-by-bit.

In other aspects, segment parser 602 may be configured to distribute the encryption bytes/bits to the streams 610 according to any other additional or alternative distribution scheme.

In some demonstrative aspects, QAM modulators 612 may be configured to generate the QAM symbols for the active sub-bands (or active subcarriers) in the active sub-channels.

In some demonstrative aspects, QAM symbol mappers 616 may be configured to load the generated QAM symbols to the active subcarriers of the active sub-bands in the active sub-channels, e.g., based on the information indicating the active sub-bands provided by active sub-band indicator 603.

Figure 7:
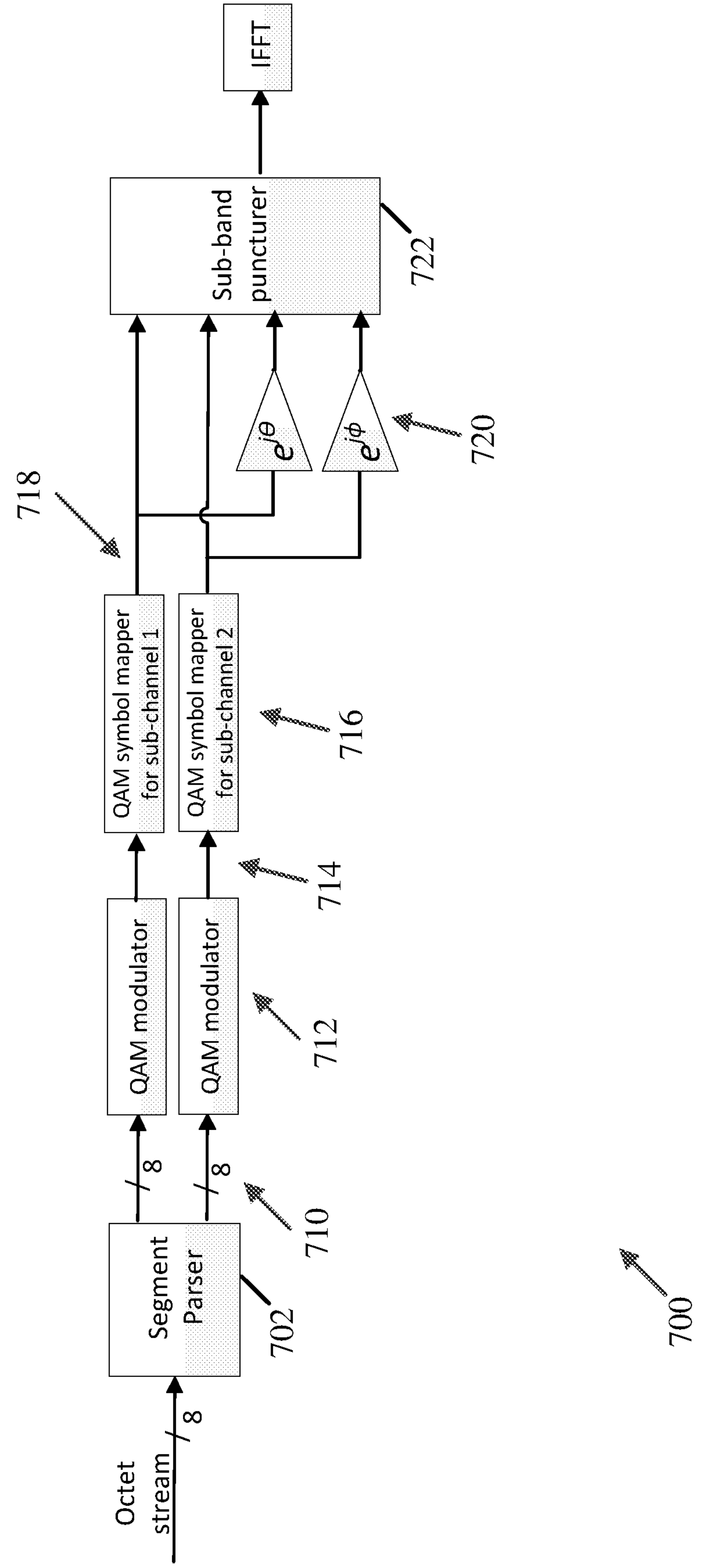
FIG. 7 is a schematic illustration of a secure wide bandwidth LTF generator, in accordance with some demonstrative aspects.

Reference is made to FIG. 7, which schematically illustrates a secure wide bandwidth LTF generator 700, in accordance with some demonstrative aspects. For example, device 102 (FIG. 1) may be configured to implement one or more elements of secure wide bandwidth LTF generator 700, and/or to perform one or more functionalities of secure wide bandwidth LTF generator 700.

In some demonstrative aspects, secure wide bandwidth LTF generator 700 may be configured to generate a secure wide bandwidth LTF over a wide channel bandwidth, for example, according to the third secure LTF sequence generation scheme, e.g., as described below.

In some demonstrative aspects, secure wide bandwidth LTF generator 700 may be configured to generate the secure wide bandwidth LTF, for example, by duplicating an LTF sounding signal over a plurality of sub-channels of the wide channel bandwidth, e.g., as described below.

In some demonstrative aspects, secure wide bandwidth LTF generator 700 may be configured to extend a secure sounding signal, which may be configured for a 160 MHz channel, e.g., in compliance with an IEEE 802.11az Specification, to one or more wider bandwidths, e.g., greater than 160 MHz.

In some demonstrative aspects, secure wide bandwidth LTF generator 700 may be configured to extend a secure sounding signal, which may be configured for a 160 MHz channel, to a wide channel bandwidth, for example, by duplicating the secure sounding signal in multiple sub-channels of the wide channel bandwidth.

In some demonstrative aspects, for example, for a wide channel bandwidth of 320 MHz, a sounding signal for 160 MHz (or 80 MHz) may be generated, and then this sounding signal may be duplicate in one or more the other 160 MHz (or 80 MHz) subchannel(s).

In some demonstrative aspects, secure wide bandwidth LTF generator 700 may include a segment parser 702 configured to distribute encryption bytes to a plurality of streams 710, which may be utilized to generate a respective plurality of sounding signals. For example, a stream may be utilized to generate a 80 MHz sounding signal over an 80 MHz channel in the wide channel bandwidth.

In some demonstrative aspects, secure wide bandwidth LTF generator 700 may include a QAM modulator 712, which may be configured to generate QAM symbols, e.g., for each stream 710.

In some demonstrative aspects, QAM modulator 712 may include a 64 QAM modulator to generate the QAM symbols according to a 64 QAM constellation scheme, e.g., in compliance with an IEEE 802.11az Specification.

In some demonstrative aspects, QAM modulator 712 may include a 256 QAM modulator to generate the QAM symbols according to a 256 QAM constellation scheme, e.g., to support higher security.

In some demonstrative aspects, QAM modulator 712 may include a 16 QAM modulator to generate the QAM symbols according to a 16 QAM constellation scheme, e.g., to support reduced complexity.

In other aspects, any other QAM constellation scheme may be used.

For example, for the ease of implementation, each byte (or each two bytes) may only indicate one constellation point in the QAM constellation. For example, some bit(s) of the byte may not be used.

In some demonstrative aspects, as shown in FIG. 7, a QAM symbol stream 714 generated by the QAM modulator 712 may be sent to a symbol mapper 716.

In some demonstrative aspects, symbol mapper 716 may be configured to map the QAM symbols to subcarriers of a sub-channel 718.

In some demonstrative aspects, sub-channel 718 may have a bandwidth of 80 MHz, e.g., in compliance with an IEEE 802.11az Specification.

In some demonstrative aspects, sub-channel 718 may have a bandwidth of 20 MHz and/or any other bandwidth.

In some demonstrative aspects, the QAM symbols mapped to the subcarriers of a sub-channel 718 may be configured as a sounding signal over a sub-channel of the wide channel bandwidth.

For example, the QAM symbols mapped to the subcarriers of a sub-channel 718 may be configured as a sounding signal over a 160 MHz (or 80 MHz) sub-channel of the wide channel bandwidth.

In some demonstrative aspects, as shown in FIG. 7, secure wide bandwidth LTF generator 700 may include a duplicator 720 configured to duplicate the sounding signal, with phase rotation, over another sub-channel, e.g., another 160 MHz (or 80 MHz) sub-channel, of the wide channel bandwidth.

Figure 8:
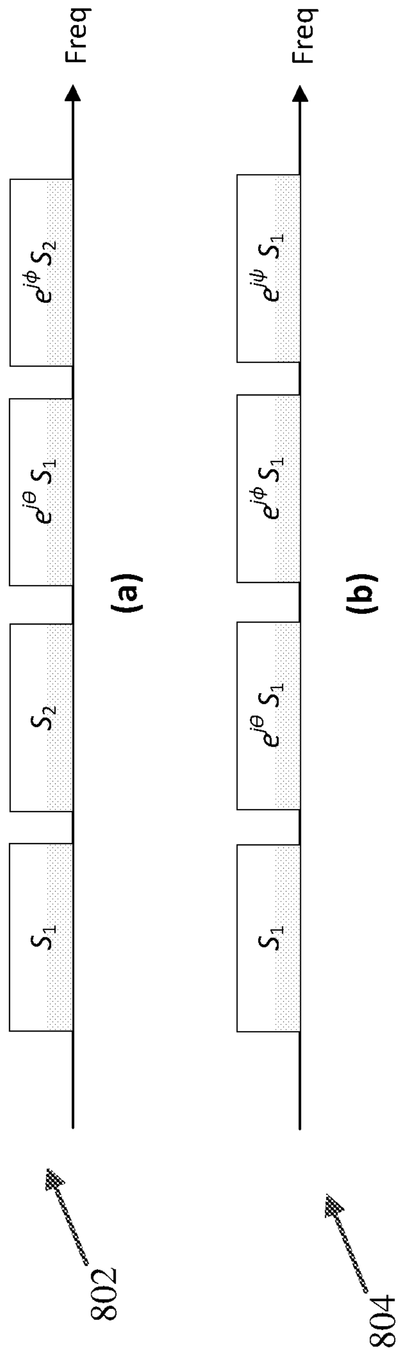
FIG. 8 is a schematic illustration of a sounding signal duplicated over frequency sub-channels in a wide channel bandwidth, in accordance with some demonstrative aspects.

Reference is also made to FIG. 8, which schematically illustrates a sounding signal duplicated over frequency sub-channels in a wide channel bandwidth, in accordance with some demonstrative aspects. For example, duplicator 720 may be configured to duplicate the sounding signal over sub-channel 718 (FIG. 7) onto another sub-channel of the wide channel bandwidth.

For example, as shown in FIG. 8, the sounding signal in one sub-channel 802, e.g., the sounding signal over sub-channel 718 (FIG. 7), may be duplicated in another sub-channel 804.

For example, as shown in FIG. 8, a phase rotation, for example, $e^{j\theta}$, $e^{j\Phi}$, $e^{j\Phi}$, +1, −1, j, and −j, may be applied to the original or duplicated signal, for example, to reduce a PAPR.

In one example, the phase rotation may be known or constant across sounding symbols.

In another example, the phase rotation may be pseudo random (or unknown to unintended receivers), e.g., for enhancing the security.

In another example, the phase rotation may vary across sounding repetitions, for example, to reduce an unintentional beamforming effect.

In other aspects, any other phase rotation may be used.

In some demonstrative aspects, as shown in FIG. 7, secure wide bandwidth LTF generator 700 may include a sub-band puncturer 722, which may be configured to puncture the QAM symbols duplicated the sub-channels. For example, sub-band puncturer 722 may be configured to remove parts of the sounding signal on some sub-band(s), e.g., before the signal is converted into time domain for transmission, e.g., as described above.

Referring back to FIG. 1, in some demonstrative aspects, a STA transmitting an NDP including a wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), to include secure LTF symbols, e.g., as described above.

In some demonstrative aspects, the secure LTF symbols may be configured to support secure channel sounding, which may be used, for example, by ranging and/or sensing applications.

In some demonstrative aspects, a STA transmitting an NDP including a wide bandwidth LTF, e.g., the STA implemented by device 102, device 140, and/or device 160, may be configured to generate the wide bandwidth LTF, e.g., wide channel bandwidth EHT-LTF 216 (FIG. 2), wide channel bandwidth EHT-LTF 316 (FIG. 3), and/or wide channel bandwidth HE-LTF 416 (FIG. 4), to include non-secure LTF symbols, e.g., as described below.

In some demonstrative aspects, the non-secure LTF symbols may be configured to support non-secure channel sounding, which may be used, for example, by non-secure ranging and/or sensing applications.

In some demonstrative aspects, non-secure LTF symbols of the a wide bandwidth LTF may be generated, for example, based on duplication.

In one example, an LTF sequence for a 160 MHz channel width may be duplicated for another 160 MHz channel width, for example, to generate an LTF sequence in the frequency domain, e.g., for a total wide channel bandwidth of 320 MHz.

In another example, an LTF sequence for an 80 MHz channel width may be duplicated for 4 times. For example, a phase rotation such as, for example, $e^{j\theta}$, $e^{j\Phi}$, $e^{j\phi}$, +1, −1, j, and −j, may be applied to the original or duplicated signal, e.g., to reduce PAPR.

For example, a sub-band puncturer may be implemented, for example, after the signal duplication, to remove the signal on some sub-band(s), e.g., before the signal is converted into time domain for transmission.

For example, for non-secure channel sounding, a cyclic prefix may be applied to the LTF symbols.

In some demonstrative aspects, a STA, e.g., a STA implemented by device 102, device 140, and/or device 160, may be configured to configure a preamble of an NDP including a wide bandwidth LTF transmitted over a wide channel bandwidth, e.g., as described below.

In some demonstrative aspects, controller 124 may be configured to control, trigger, cause, and/or instruct device 102 to set a preamble of the NDP to include an indication of the wide channel bandwidth, e.g., as described below.

In some demonstrative aspects, controller 124 may be configured to control, trigger, cause, and/or instruct device 102 to set a preamble of the NDP to include an indication of one or more punctured sub-bands in the wide channel bandwidth, e.g., as described below.

In some demonstrative aspects, a STA, e.g., a STA implemented by device 102, device 140, and/or device 160, may be configured to transmit an NDP announcement before transmitting an NDP including a wide bandwidth LTF, e.g., as described below.

In some demonstrative aspects, controller 124 may be configured to control, trigger, cause, and/or instruct device 102 to transmit an NDPA prior to transmitting an NDP over a wide channel bandwidth, e.g., as described below.

In some demonstrative aspects, controller 124 may be configured to control, trigger, cause, and/or instruct device 102 to configure the NDPA to include an indication of a wide channel bandwidth NDPA for channel sounding, e.g., as described below.

In some demonstrative aspects, controller 124 may be configured to control, trigger, cause, and/or instruct device 102 to configure the NDPA to include an indication of the wide channel bandwidth of the NDP, e.g., as described below.

In some demonstrative aspects, controller 124 may be configured to control, trigger, cause, and/or instruct device 102 to configure the NDPA to include an indication of one or more punctured sub-bands in the wide channel bandwidth of the NDP, e.g., as described below.

In some demonstrative aspects, controller 124 may be configured to control, trigger, cause, and/or instruct device 102 to configure the NDPA to include a dialog token field configured to indicate a type of the NDPA, e.g., as described below.

In some demonstrative aspects, the dialog token field may include two bits to indicate the type of the NDPA, e.g., as described below.

In some demonstrative aspects, controller 124 may be configured to control, trigger, cause, and/or instruct device 102 to set the two bits of the dialog token field to indicate a ranging NDPA, e.g., as described below.

In some demonstrative aspects, controller 124 may be configured to control, trigger, cause, and/or instruct device 102 to set the two bits of the dialog token field to indicate an EHT NDPA, e.g., as described below.

In some demonstrative aspects, a STA, e.g., a STA implemented by device 102, device 140, and/or device 160, may be configured to transmit an NDPA according to an NDPA format, which may be configured to support a wide bandwidth NDP, for example, for wide bandwidth ranging and/or sensing, e.g., as described below.

In some demonstrative aspects, the NDPA format for a wide bandwidth NDP may be based on a modification of an NDPA format, e.g., in accordance with an IEEE 802.11az Specification and/or an IEEE 802.11be Specification.

In some demonstrative aspects, the NDPA format for a wide bandwidth NDP may be configured in compliance with an IEEE 802.11bf Specification.

In some demonstrative aspects, a STA, e.g., a STA implemented by device 102, device 140, and/or device 160, may be configured to transmit a wide bandwidth NDP according to a trigger based (TB) mechanism, e.g., as described below.

In some demonstrative aspects, a STA, e.g., a STA implemented by device 102, device 140, and/or device 160, may be configured to transmit a wide bandwidth NDP according to a non-trigged based (non-TB) mechanism, e.g., as described below.

For example, for non-trigger based ranging, an NDPA frame may be sent before an NDP sounding frame. The NDPA may be configured to carry information, e.g., most of the information, about the ranging exchange, for example, as the subsequent NDP sounding frames may be transmitted without data fields.

Figure 9:
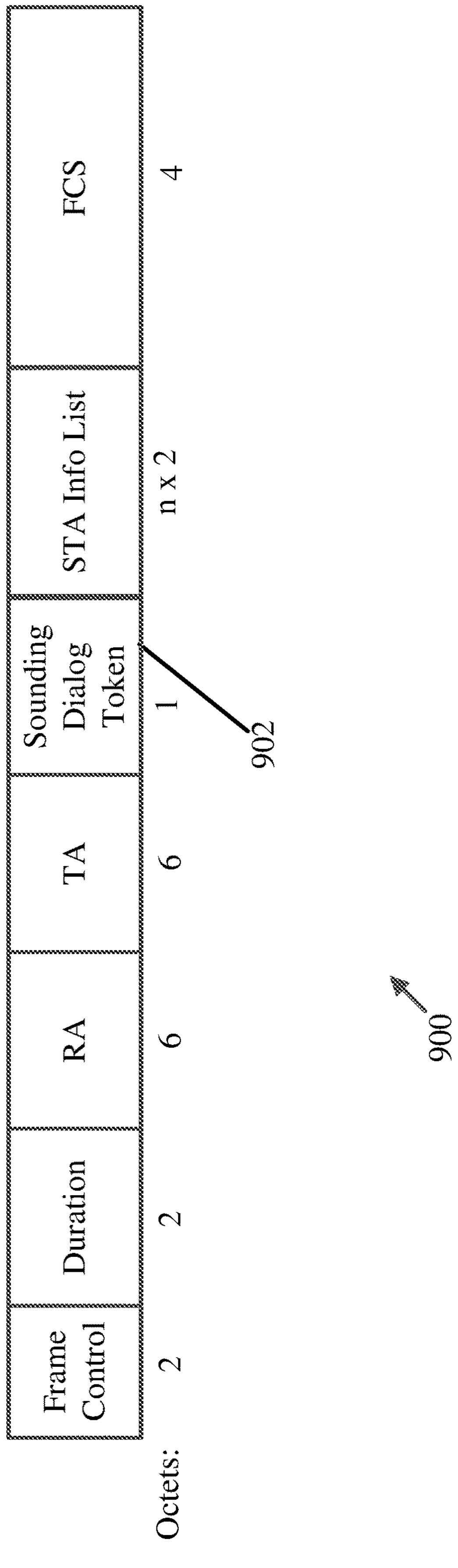
FIG. 9 is a schematic illustration of an NDP Announcement (NDPA) frame format, which may be implemented in accordance with some demonstrative aspects.
Figure 10:
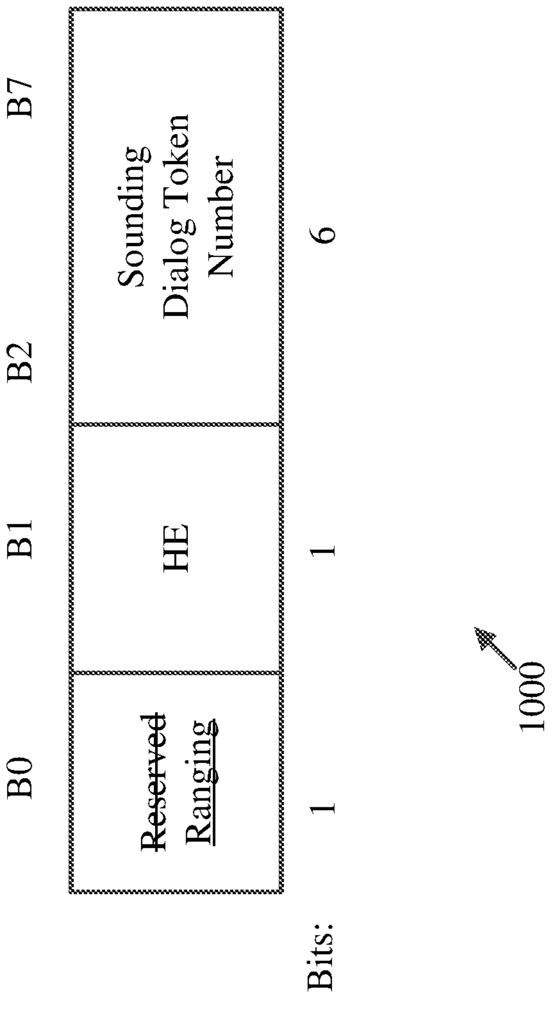
FIG. 10 is a schematic illustration of a sounding dialog token field format, which may be implemented in accordance with some demonstrative aspects.

Reference is made to FIG. 9, which schematically illustrates an NDPA frame format 900, and to FIG. 10, which schematically illustrates a sounding dialog token field format 1000, which may be implemented in accordance with some demonstrative aspects.

For example, as shown in FIG. 9, the NDPA frame 900 may include a sounding dialog token ("token") field 902, e.g., having a size of one octet.

For example, as shown in FIG. 10, the sounding dialog token field 902 may be configured according to the sounding dialog token field format 1000.

For example, as shown in FIG. 10, the NDPA frame 900 may be configured to use the first two bits of the sounding dialog token field 1000 to indicate an NDPA type of the NDPA frame 900.

For example, the first two bits of the sounding dialog token field 1000 may be configured to indicate the NDPA type, e.g., as follows:

TABLE 1

| B0 | B1 | NDPA Types |
|---|---|---|
| 0 | 0 | VHT NDPA |
| 0 | 1 | HE NDPA |
| 1 | 0 | Ranging NDPA |
| 1 | 1 | EHT NDPA |

In other aspects, the sounding dialog token field 1000 may be configured to indicate the NDPA type according to any other scheme and/or coding.

In some demonstrative aspects, the NDPA 900 may be configured as an NDPA of a first type, for example, a ranging NDPA, for example, to announce the wide bandwidth NDP. For example, configuring the NDPA 900 as a ranging NDPA may provide a technical solution in compliance with an IEEE 802.11az Specification, which may support many ranging features, e.g., including secure ranging features.

In some demonstrative aspects, the NDPA 900 may be configured as an NDPA of a second type, for example, an EHT NDPA, for example, to announce the wide bandwidth NDP. For example, configuring the NDPA 900 as an EHT NDPA may provide a technical solution in compliance with an IEEE 802.11be Specification, which may support a bandwidth wider than 160 MHz, and/or sub-band puncturing.

In some demonstrative aspects, the NDPA 900 may be a MAC frame, which may be carried in a payload of a PPDU carrying the NDPA 900. Accordingly, the NDPA 900 may be carried by different types of PPDUs, e.g., non-HT, non-HT duplicate, HT, VHT, HE, and/or EHT.

In some demonstrative aspects, the wide bandwidth NDP may be a PPDU, and the NDP type may be chosen from VHT, HE, and/or EHT.

In some demonstrative aspects, a wide bandwidth NDP, e.g., for channel sounding over a wide channel bandwidth of at least 320 MHz, may be implemented by configuring wide channel bandwidth support, e.g., 320 MHz support, for a ranging NDPA and/or a ranging trigger frame, e.g., as described below.

Figure 11:
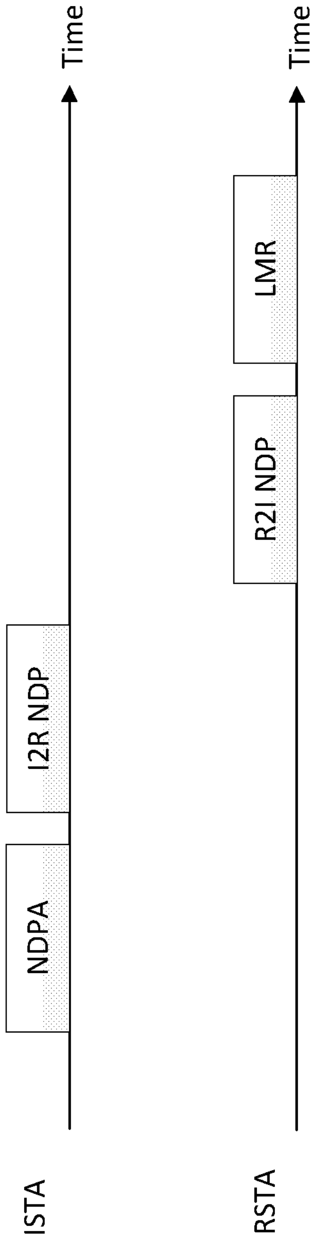
FIG. 11 is a schematic illustration of a frame exchange sequence for non-Trigger-Based (non-TB) ranging, which may be implemented in accordance with some demonstrative aspects.

Reference is made to FIG. 11, which schematically illustrates a frame exchange sequence for non-Trigger-Based (non-TB) ranging, which may be implemented in accordance with some demonstrative aspects.

For example, as shown in FIG. 11, the non-TB ranging may include transmission of an NDPA followed by an Initiator to Responder (I2R) NDP, for example, from an Initiator STA (ISTA) to a Responder STA (RSTA). In one example, device 102 (FIG. 1) may be configured to perform one or more operations of, and/or one or more functionalities of, the ISTA. In another example, device 102 (FIG. 1) may be configured to perform one or more operations of, and/or one or more functionalities of, the RSTA.

For example, as shown in FIG. 11, the non-TB ranging may include transmission of a Responder to Initiator (R2I) NDP, for example, from the RSTA to the ISTA.

For example, as shown in FIG. 11, the non-TB ranging may include transmission of Location Measurement Report (LMR), for example, from the RSTA to the ISTA, e.g., after the E2I NDP.

For example, a non-TB sensing exchange may be similar to the non-TB ranging frame exchange of FIG. 11. For example, the second NDP, e.g., the R2I NDP, may not be needed, and the LMR may be removed or replaced by another type of report frame, e.g., a Channel State Indicator (CSI) report.

In some demonstrative aspects, one or more messages of the non-TB ranging frame exchange and/or the non-TB sensing frame exchange may be configured to support channel sounding over the wide channel bandwidth of at least 320 MHz, e.g., as described below.

In some demonstrative aspects, one or more messages of the non-TB ranging frame exchange and/or the non-TB sensing frame exchange may be configured to support the ISTA in signaling information to indicate the wide channel bandwidth of the NDP, e.g., as described below.

In some demonstrative aspects, one or more messages of the non-TB ranging frame exchange and/or the non-TB sensing frame exchange may be configured to support the ISTA in signaling information to indicate sub-band puncturing to be applied to the NDP, e.g., as described below.

In some demonstrative aspects, a MAC payload of the NDPA may be configured to signal information to indicate the wide channel bandwidth of the NDP and/or the sub-band puncturing to be applied to the NDP, e.g., as described below.

In some demonstrative aspects, a preamble of the NDPA may be configured to signal information to indicate the wide channel bandwidth of the NDP and/or the sub-band puncturing to be applied to the NDP.

In some demonstrative aspects, preambles of one or more NDPs following the NDPA may be configured to signal information to indicate the wide channel bandwidth and/or the sub-band puncturing.

In some demonstrative aspects, the ranging NDPA may be configured to include a Partial BW information (Info) subfield, which may be configured to indicate the occupied bandwidth on which sub-channels or sub-bands the sounding signal is on. This Partial BW Info field may be included, for example, in a STA Info field of the Ranging NDPA, and/or as part of any other field of the NDPA.

In some demonstrative aspects, the STA Info field of the Ranging NDPA may be extended to support the Partial BW Info field and/or sub-band puncturing information, e.g., as described below.

In some demonstrative aspects, the length of the STA Info field may be extended, e.g., using two existing STA Info fields for serving one STA, for example, to provide enough bits in the STA Info field to support the Partial BW Info field and/or sub-band puncturing information.

For example, the NDPA may be configured to include an additional STA Info field whose Association Identifier (AID) field may be set, for example, to a specific number, e.g., 2046, or any other value. This specific number, e.g., 2046, may be configured to indicate that the STA Info field contains additional information, e.g., the Partial BW and/or sub-band puncturing information.

For example, information for sensing, e.g., an indication of one way sounding and/or an indication of report or no report, may be included in the additional STA Info field.

For example, in case one additional STA Info field is not enough, one or multiple additional STA Info fields may be included. For example, each additional STA Info field may have a different specific AID number, e.g., 2047, or any other value.

In some demonstrative aspects, a format of an NDPA, e.g., a new format, and/or a format of a STA Info field, e.g., a new format, may be defined, for example, to support the Partial BW Info field and/or sub-band puncturing information, e.g., as described below.

For example, controller 124 may be configured to control, trigger, cause, and/or instruct device 102 to generate, process, and/or transmit the new format of the NDPA and/or the new format of the STA Info field.

For example, one of multiple reserved bits in the Ranging NDPA may be set to indicate that the Ranging NDPA is switched to a new sub-type or type of NDPA, for example, a wide bandwidth NDPA, e.g., sensing NDPA or 320 MHz NDPA, which may be different from an existing Ranging NDPA, e.g., supporting up to 160 MHz.

For example, the reserved bit(s) may be in the STA Info field of the NDPA.

For example, by setting the reserved bit(s) in the NDPA, e.g., in the STA Info field of the Ranging NDPA, the remaining bits in the ranging NDPA, e.g., in the STA Info field of the Ranging NDPA, may be reused, for example, to support 320 MHz ranging/sensing, e.g., as described below.

In some demonstrative aspects, the sounding dialog token field (token) of the NDPA may be used to indicate one or more NDPA amendments, for example, according to a next generation format, which may be configured for communication of wide channel bandwidth NDPs.

For example, controller 124 (FIG. 1) may be configured to control, trigger, cause, and/or instruct device 102 to perform one or more operations and/or functionalities of a new generation (gen) STA, which may be configured to communicate wide channel bandwidth NDPs, e.g., as described herein.

For example, an amendment to an NDPA format may be indicated by setting the first two bits of the sounding dialog token subfield to "10", e.g., by setting the bits B0B1 to "10", for example, to indicate Ranging NDPA, e.g., as described above.

In some demonstrative aspects, one or more residual bits of the sounding dialog token subfield, e.g., the residual 6 bits of the sounding dialog token subfield, may be repurposed to indicate future NDPA amendments.

For example, for Ranging NDPA, the association between a Ranging NDPA frame and a sounding feedback may not be required, for example, in case sounding feedback retransmission is disallowed such that any sounding feedback, which is solicited by a Ranging NDPA, may always follow an NDP frame.

In one example, all 6 bits of the sounding dialog token subfield may be freed up, and be used for NDPA amendments indication.

For example, in case a legacy client receives the NDPA with the format described above (next generation format), the legacy client may parse the fields as if the NDPA is a Ranging NDPA, for example, since the first two bits of sounding dialog token subfield are set as "10". As the legacy client may not be able to find its own AID in the STA Info fields, (e.g., assuming a next gen AP is not supposed to address a next gen STA info field to a legacy STA), the legacy client may decide to drop the NDPA frame. Accordingly, only next generation clients may understand the NDPA type indication in the residual 6 bits of the token, and, accordingly, may read the NDPA fields correctly.

In some demonstrative aspects, it may be defined that a legacy device cannot send a Ranging NDPA, which sets the token value the same as future NDPA amendments. For example, if this limitation is not implemented, a next gen device may parse the Ranging NDPA as if it is the new generation NDPA.

In some demonstrative aspects, it may be defined that the STA info field of the new generation NDPA frame may have a same size as the STA info field of the legacy Ranging NDPA frame. For example, if this limitation is not implemented, a legacy STA may suffer from a false alarm of AID match.

For example, it may be defined for a legacy STA that if the bits B0B1 in the token are equal to "10", the legacy STA is to parse the NDPA as a legacy Ranging NDPA and try to find its own AID.

For example, it may be defined for a new generation STA that if the bits B0B1 in the token are equal to "10", the new generation STA is to check the residual 6 bits in the token to find an NDPA signature for a new generation NDPA frame. If a signature is found, then the new generation STA is to parse the NDPA as a new generation NDPA frame. Otherwise, the new generation STA is to parse the NDPA as legacy Ranging NDPA.

In some demonstrative aspects, reserved bits in a STA info field of a legacy Ranging NDPA format may be utilized to indicate the new NDPA format, e.g., the next generation NDPA format.

For example, the STA Info field of a Ranging NDPA frame may include a plurality of reserved bits, e.g., 1-4 reserved bits.

In some demonstrative aspects, the reserved bits in the STA Info field of the Ranging NDPA frame may be used to indicate a new (next gen) type of NDPA frame.

For example, two reserved bits in the STA Info field of the Ranging NDPA frame may be configured to indicate 2 or 3 future amendments. For a future NDPA frame, the bits B0B1 in the sounding dialog token sub-field may be set to "10", for example, to route a processing engine at a receiver STA to process the NDPA as a Ranging NDPA frame. The receiver STA may then identify the NDPA as a future amendment, for example, by identifying a signature in the 2 reserved bits of the STA Info field.

For example, for a legacy STA, if the bits B0B1 in the sounding dialog token sub-field are equal to "10", the legacy STA may parse the NDPA as a legacy Ranging NDPA, and try to find its own AID. If the NDPA frame is indeed a legacy Ranging NDPA, the legacy STA may find its own AID and parse the frame as a legacy Ranging NDPA frame. If the NDPA frame is a next gen NDPA frame, the legacy STA may not be supposed to find a STA user info field that matches its own AID, e.g., since a next gen AP may not be supposed to address a next gen STA info field to a legacy STA.

In some demonstrative aspects, for a future non-AP STA, e.g., a next gen STA implemented by device 102, if the bits B0B1 in the sounding dialog token sub-field are equal to "10", future non-AP STA may check the AID11 subfield of each STA info field. For example, if the AID11 subfield matches its own AID, the future non-AP STA may check the reserved bits. If the reserved bits match a future generation signature, then the future non-AP STA may parse the STA Info field as a future gen STA info. Otherwise, the future non-AP STA mat parse the STA info as an EHT STA info field.

In some demonstrative aspects, a STA, e.g., a STA implemented by device 102 (FIG. 1), device 140 (FIG. 1), and/or device 160 (FIG. 1), may be configured to communicate a partial bandwidth indication corresponding to a wide channel bandwidth NDP, for example, using a PHY header, e.g., as described below.

In some demonstrative aspects, it may be preferred not to add a bandwidth indication to a ranging NDPA, for example, since an existing Ranging NDPA format may not have the bandwidth indication for both non-secure and secure ranging.

In some demonstrative aspects, the bandwidth information corresponding to the bandwidth of the wide channel bandwidth NDP may be indicated, for example, in a preamble of the NDPA and/or the NDP, e.g., as described below.

Figure 12:
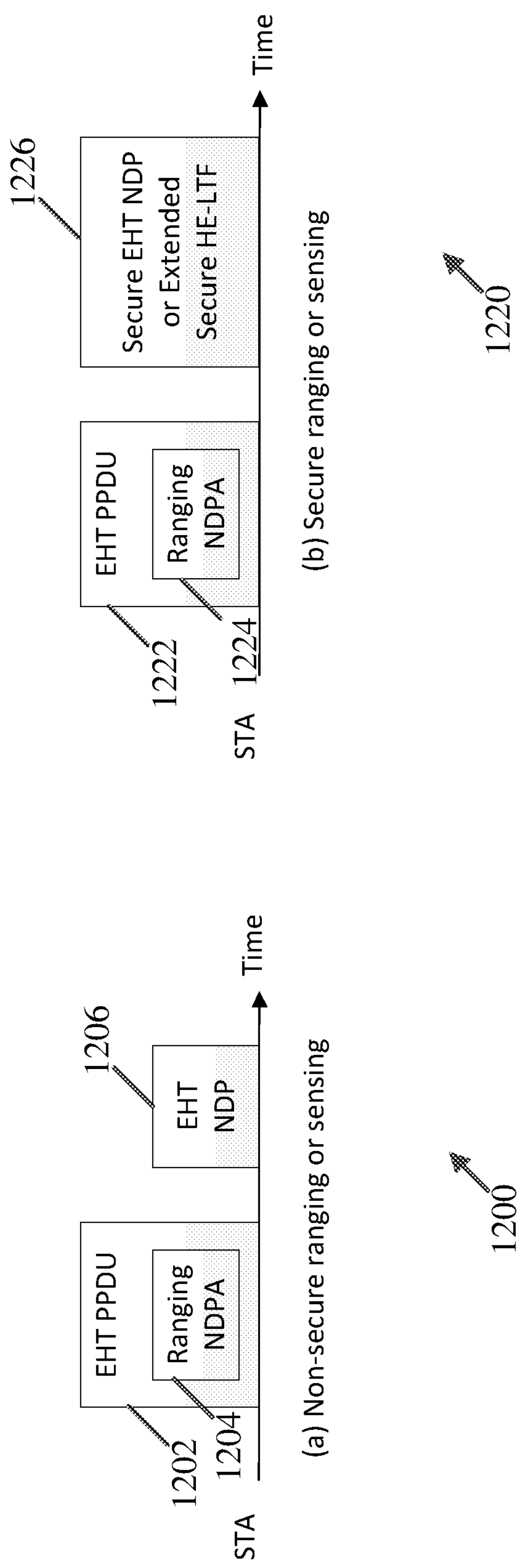
FIG. 12 is a schematic illustration of a sequence of frames to communicate an NDPA and an NDP, in accordance with some demonstrative aspects.

Reference is made to FIG. 12, which schematically illustrated a sequence of frames to communicate an NDPA and an NDP, in accordance with some demonstrative aspects.

In some demonstrative aspects, as shown in FIG. 12, a frame exchange 1200 for non-secure ranging or sensing may include transmission of an EHT PPDU 1202 including a ranging NDPA 1204. For example, as shown in FIG. 12, the frame exchange 1200 for non-secure ranging or sensing may include transmission of an EHT NDP 1206, e.g., following the EHT PPDU 1202.

In some demonstrative aspects, as shown in FIG. 12, a frame exchange 1220 for secure ranging or sensing may include transmission of an EHT PPDU 1222 including a ranging NDPA 1224. For example, the ranging NDPA 1224 may include an indication of a type of the NDPA to support a wide channel bandwidth NDP, e.g., as described above.

In some demonstrative aspects, as shown in FIG. 12, the frame exchange 1220 may include transmission of an EHT NDP 1226, e.g., following the EHT PPDU 1222.

In some demonstrative aspects, as show in FIG. 12, the EHT NDP 1226 may be configured for wide channel bandwidth sounding, e.g., using the wide channel LTF, e.g., as described above.

In some demonstrative aspects, it may be defined that the occupied bandwidth of the NDPA and NDP shall be the same.

In some demonstrative aspects, the EHT PPDU format may be utilized to send the NDPA and send the following NDP(s), for example, using the same bandwidth as the PPDU carrying the NDPA.

In some demonstrative aspects, this implementation ay provide a technical solution to reuse an existing Ranging NDPA format, for example, even without modifying the NDPA itself.

In some demonstrative aspects, the bandwidth indication may be included only in the preamble of NDP, e.g., in a U-SIG field. Accordingly, the NDPA may be sent by an EHT or non-EHT PPDU.

For example, it may be defined that a sounding receiver of the NDP should determine the sounding bandwidth, for example, using the preamble of the NDP.

For example, for a ranging case, it may be defined that the two NDPs should occupy the same bandwidth.

In some demonstrative aspects, the bandwidth indication may be included in the preamble of NDPA. For example, the NDPA may be carried by an EHT PPDU, e.g., with a U-SIG field. For example, the occupied bandwidth may be indicated by the bandwidth (BW) field, and Puncturing Channel Information fields in the U-SIG field. For example, it may be defined that the NDPA and the following NDP(s) should occupy the same bandwidth.

In some demonstrative aspects, for example, for secure ranging or sensing, the NDP may use a modified EHT NDP format, which may be configured to carry OFDM symbols with pseudo random QAMs and zero-power guard intervals, e.g., instead of an EHT-LTF. For example, a U-SIG field of the NDP may be configured to indicate the occupied bandwidth of the NDP, for example, using the BW field and the Puncturing Channel Information field. For example, encryption information may be carried by the NDPA and the LMR.

Figure 13:
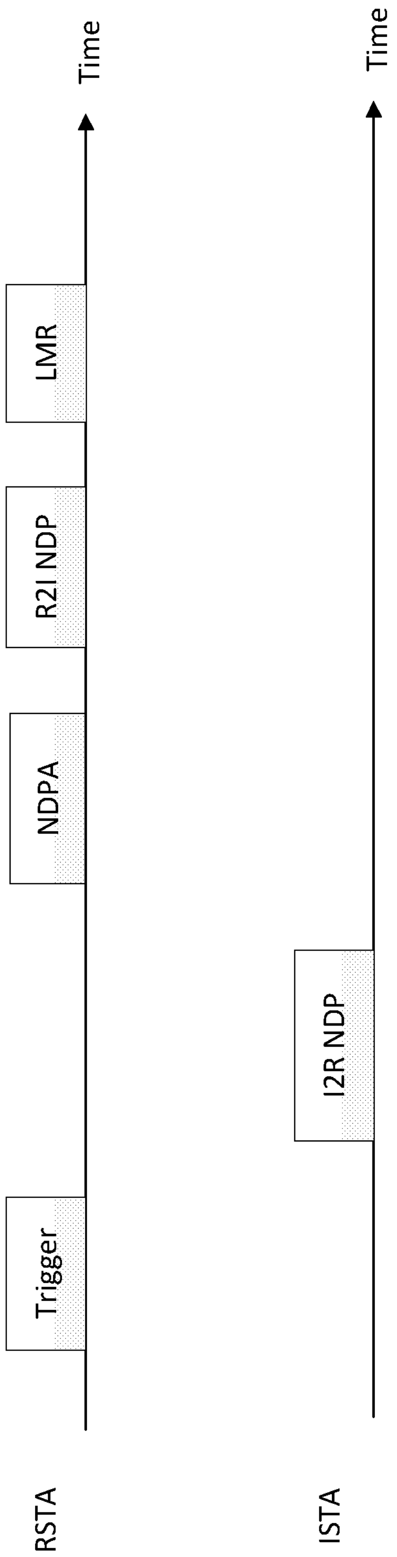
FIG. 13 is a schematic illustration of a frame exchange sequence for Trigger-Based (TB) ranging, which may be implemented in accordance with some demonstrative aspects.

Reference is made to FIG. 13, which schematically illustrates a frame exchange sequence for Trigger-Based (TB) ranging, which may be implemented in accordance with some demonstrative aspects.

For example, as shown in FIG. 13, the TB ranging may include transmission of a trigger frame from an RSTA to an ISTA. In one example, device 102 (FIG. 1) may be configured to perform one or more operations of, and/or one or more functionalities of, the ISTA. In another example, device 102 (FIG. 1) may be configured to perform one or more operations of, and/or one or more functionalities of, the RSTA.

For example, as shown in FIG. 13, the TB ranging may include transmission of an I2R NDP from the ISTA to the RSTA, for example, based on the trigger.

For example, as shown in FIG. 13, the TB ranging may include transmission of an NDPA followed by an R2I NDP and an LMR, for example, from the RSTA to the ISTA.

In some demonstrative aspects, one or more reserved bits of one or mor fields may be used to support 320 MHz and sub-band puncturing, for example, for trigger-based channel sounding, e.g., according to the frame exchange of FIG. 13, which can be used for ranging and sensing, e.g., as described below.

In some demonstrative aspects, the one or more reserved bits may include reserved bits of a STA info field and/or a ranging trigger subtype subfield encoding, e.g., as described below.

Figure 14:
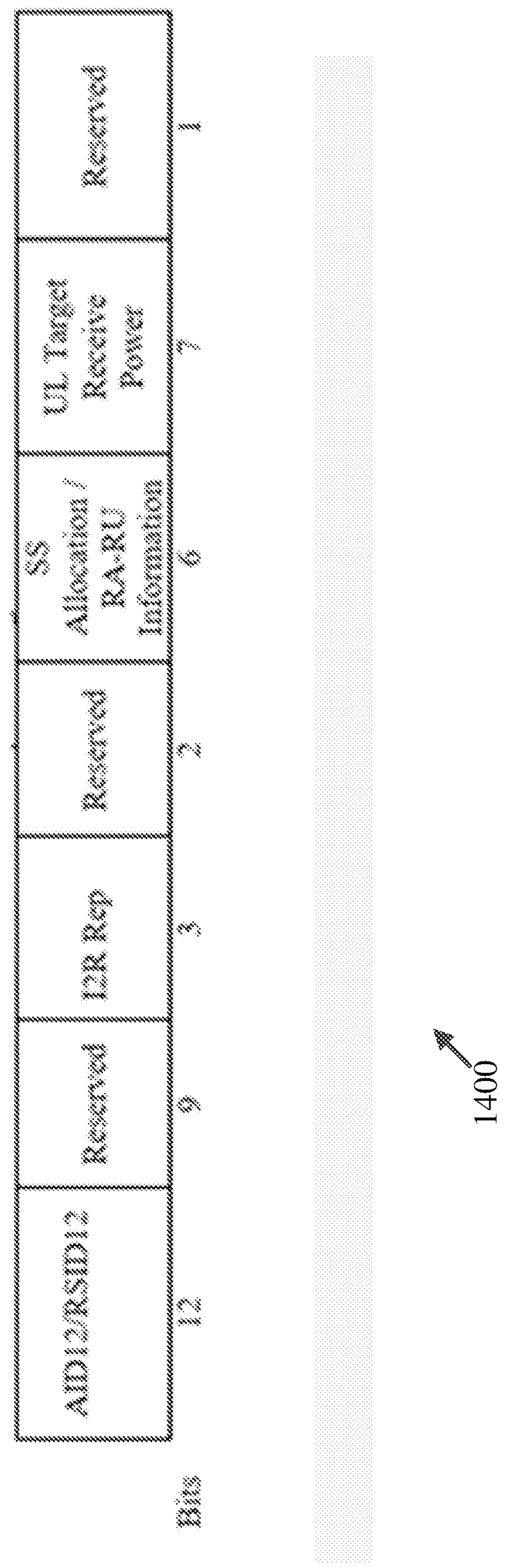
FIG. 14 is a schematic illustration of a Station (STA) information (info) field format, which may be implemented in accordance with some demonstrative aspects.

Reference is also made to FIG. 14, which schematically illustrates a STA info field format 1400, which may be implemented in accordance with some demonstrative aspects.

For example, a ranging trigger subtype subfield encoding may be defined to include a plurality of bits, e.g., as follows:

TABLE 2

| Ranging Trigger Subtype Subfield value | Ranging Trigger Frame Subvariant |
|---|---|
| 0 | Poll |
| 1 | Sounding |
| 2 | Secure Sounding |
| 3 | Report |
| 4 | Passive Sounding |
| 5-15 | Reserved |

For example, one or more of the reserved bits of STA info field 1400 and/or the reserved entries in Table 2 may be used to support 320 MHz and sub-band puncturing.

For example, entry 5 in Table 2 may be configured to indicate a sensing Trigger, which solicits a one-way sounding, e.g., instead of two-way sounding.

For example, one or more of the reserved bits of STA info field 1400 may be configured to indicate the extended 320 MHz and sub-puncturing, e.g., together with the 6 bits in the field of "SS Allocation/RA-RU Information".

For example, information related sensing, e.g., report or no report, may be indicated using the reserved bits.

For example, if one User Info field is not enough to carry the indications, another User Info field can be used for the same user or station.

In one example, the first User Info field of the user may have the user's AID and the second User Info field of the same user may have the same AID with a reserved bit set to indicate this is the second User Info field.

In another example, the first User Info field of the user may have the user's AID, and the second User Info field of the same user may use a special AID, e.g., like 2043-2044, to indicate this (User Info) field is an extension of the previous User Info field.

Figure 15:
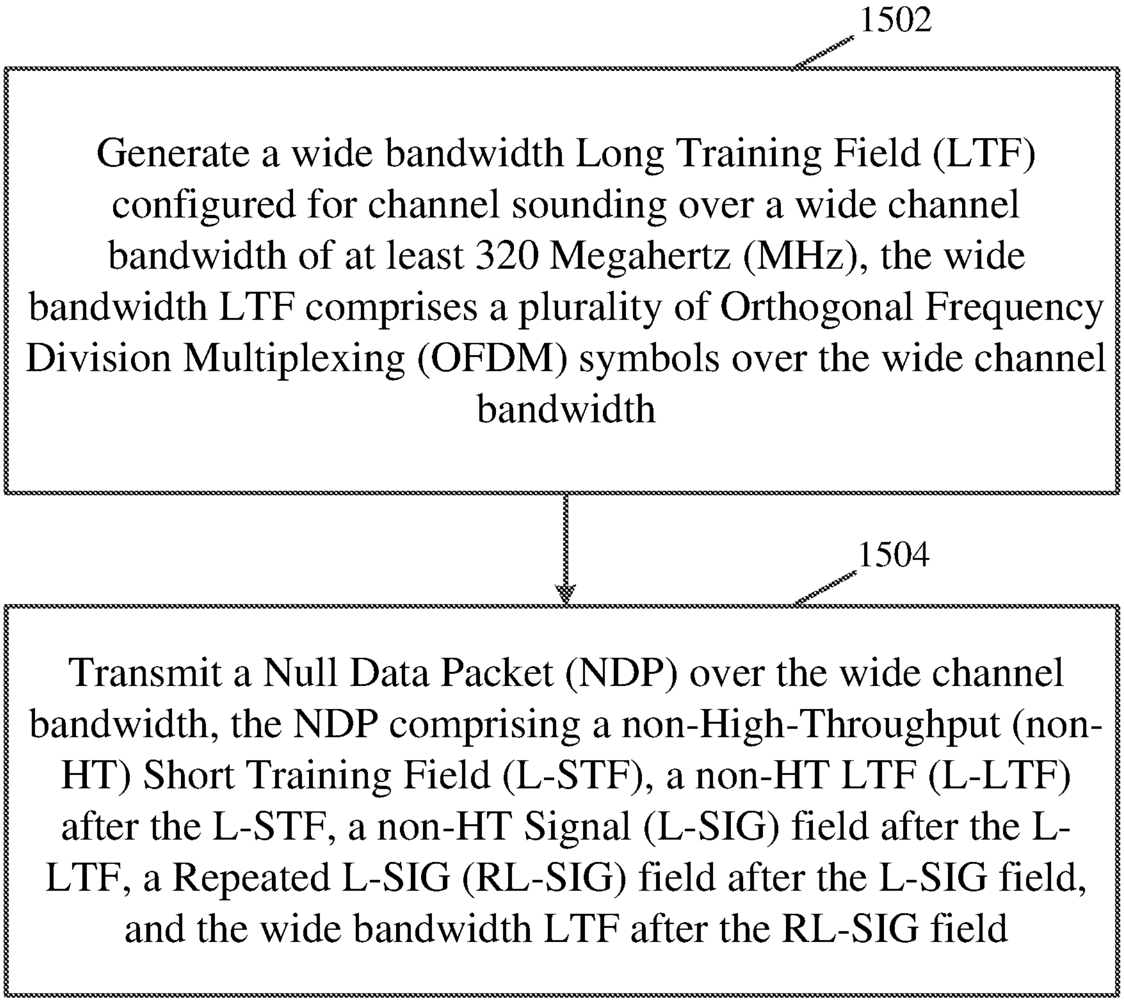
FIG. 15 is a schematic flow-chart illustration of a method of channel sounding over a wide channel bandwidth, in accordance with some demonstrative aspects.

Reference is made to FIG. 15, which schematically illustrates a method of channel sounding over a wide channel bandwidth, in accordance with some demonstrative aspects. For example, one or more of the operations of the method of FIG. 15 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1502, the method may include generating a wide bandwidth LTF configured for channel sounding over a wide channel bandwidth of at least 320 Megahertz (MHz), the wide bandwidth LTF including a plurality of OFDM symbols over the wide channel bandwidth. For example, controller 124 (FIG. 1) may be configured to cause, trigger, and/or control device 102 (FIG. 1) to generate the wide bandwidth LTF, e.g., as described above.

As indicated at block 1504, the method may include transmitting an NDP over the wide channel bandwidth, the NDP including an L-STF, an L-LTF after the L-STF, an L-SIG field after the L-LTF. an RL-SIG field after the L-SIG field, and the wide bandwidth LTF after the RL-SIG field. For example, controller 124 (FIG. 1) may be configured to cause, trigger, and/or control device 102 (FIG. 1) to transmit the NDP including the wide bandwidth LTF over the wide channel bandwidth, e.g., as described above.

Figure 16:
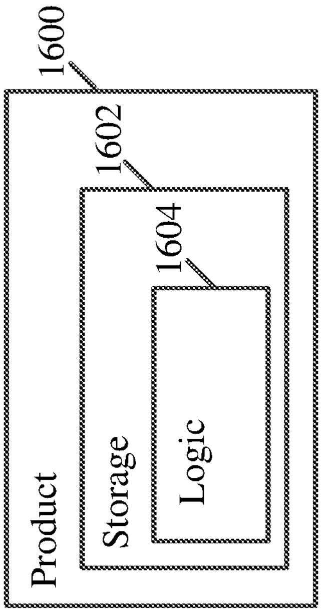
FIG. 16 is a schematic illustration of a product of manufacture, in accordance with some demonstrative aspects.

Reference is made to FIG. 16, which schematically illustrates a product of manufacture 1600, in accordance with some demonstrative aspects. Product 1600 may include one or more tangible computer-readable ("machine-readable") non-transitory storage media 1602, which may include computer-executable instructions, e.g., implemented by logic 1604, operable to, when executed by at least one computer processor, enable the at least one computer processor to implement one or more operations at device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1-15, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1600 and/or machine readable storage media 1602 may include one or more types of computer-readable storage media capable of storing data, including volatile memory, non-volatile memory, removable or non-removable memory, erasable or non-erasable memory, writeable or re-writeable memory, and the like. For example, machine readable storage media 1602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication device to generate a wide bandwidth Long Training Field (LTF) configured for channel sounding over a wide channel bandwidth of at least 320 Megahertz (MHz), the wide bandwidth LTF comprises a plurality of Orthogonal Frequency Division Multiplexing (OFDM) symbols over the wide channel bandwidth; and transmit a Null Data Packet (NDP) over the wide channel bandwidth, the NDP comprising a non-High-Throughput (non-HT) Short Training Field (L-STF), a non-HT LTF (L-LTF) after the L-STF, a non-HT Signal (L-SIG) field after the L-LTF, a Repeated L-SIG (RL-SIG) field after the L-SIG field, and the wide bandwidth LTF after the RL-SIG field.

Example 2 includes the subject matter of Example 1, and optionally, wherein the wide bandwidth LTF comprises a secure wide bandwidth LTF, wherein an OFDM symbol of the plurality of OFDM symbols comprises a plurality of encrypted Quadrature Amplitude Modulation (QAM) symbols over a plurality of subcarriers.

Example 3 includes the subject matter of Example 2, and optionally, wherein the plurality of encrypted QAM symbols comprises a plurality of encrypted 64-QAM symbols.

Example 4 includes the subject matter of Example 2, and optionally, wherein the plurality of encrypted QAM symbols comprises a plurality of encrypted 16-QAM symbols.

Example 5 includes the subject matter of Example 2, and optionally, wherein the plurality of encrypted QAM symbols comprises a plurality of encrypted 256-QAM symbols.

Example 6 includes the subject matter of any one of Examples 2-5, and optionally, wherein the secure wide bandwidth LTF comprises a zero-power guard interval.

Example 7 includes the subject matter of any one of Examples 2-6, and optionally, wherein the apparatus is configured to cause the wireless communication device to puncture the wide bandwidth LTF over one or more punctured sub-bands in the wide channel bandwidth.

Example 8 includes the subject matter of Example 7, and optionally, comprising a segment parser configured to parse a stream of encryption bytes into at least three streams; a QAM modulator configured to generate at least three QAM symbol streams by modulating the at least three streams according to a QAM scheme; a QAM symbol mapper configured to map QAM symbols of the at least three QAM symbol streams to sub-carriers of at least three respective sub-bands in the wide channel bandwidth; and a sub-band puncturer configured to remove QAM symbols mapped to the one or more punctured sub-bands.

Example 9 includes the subject matter of Example 7, and optionally, comprising a segment parser configured to parse a stream of encryption bytes into at least three streams based on the one or more punctured sub-bands; a QAM modulator configured to generate at least three QAM symbol streams by modulating the at least three streams according to a QAM scheme; and a QAM symbol mapper configured to map QAM symbols of the at least three QAM symbol streams to sub-carriers of at least three respective sub-bands in the wide channel bandwidth based on the one or more punctured sub-bands.

Example 10 includes the subject matter of Example 7, and optionally, comprising a segment parser configured to parse a stream of encryption bytes into a plurality of streams; a QAM modulator configured to generate a plurality of QAM symbol streams by modulating the plurality of streams according to a QAM scheme; a QAM symbol mapper configured to map QAM symbols of the plurality of QAM symbol streams to a sounding signal over sub-carriers of a plurality of respective sub-bands in a first part of the wide channel bandwidth; a duplicator configured to duplicate the sounding signal, with phase rotation, over sub-carriers of a plurality of respective sub-bands in a second part of the wide channel bandwidth; and a sub-band puncturer configured to remove QAM symbols mapped to the one or more punctured sub-bands.

Example 11 includes the subject matter of any one of Examples 1-10, and optionally, wherein the apparatus is configured to cause the wireless communication device to transmit an NDP Announcement (NDPA) prior to the NDP, the NDPA comprising a dialog token field comprising two bits to indicate a type of the NDPA.

Example 12 includes the subject matter of Example 11, and optionally, wherein the apparatus is configured to cause the wireless communication device to set the two bits to indicate a ranging NDPA.

Example 13 includes the subject matter of Example 11, and optionally, wherein the apparatus is configured to cause the wireless communication device to set the two bits to indicate an Extremely High Throughput (EHT) NDPA.

Example 14 includes the subject matter of any one of Examples 1-10, and optionally, wherein the apparatus is configured to cause the wireless communication device to transmit an NDP Announcement (NDPA) prior to the NDP, the NDPA comprising an indication of a wide channel bandwidth NDPA for channel sounding.

Example 15 includes the subject matter of any one of Examples 1-10, and optionally, wherein the apparatus is configured to cause the wireless communication device to transmit an NDP Announcement (NDPA) prior to the NDP, the NDPA comprising at least one of an indication of the wide channel bandwidth, or an indication of one or more punctured sub-bands in the wide channel bandwidth.

Example 16 includes the subject matter of any one of Examples 1-15, and optionally, wherein the apparatus is configured to cause the wireless communication device to set a preamble of the NDP comprising at least one of an indication of the wide channel bandwidth, or an indication of one or more punctured sub-bands in the wide channel bandwidth.

Example 17 includes the subject matter of any one of Examples 1-16, and optionally, wherein the NDP comprises a Unified Signal (U-SIG) field after the RL-SIG field, and an Extremely High Throughput (EHT) STF (EHT-STF) after the U-SIG field, wherein the wide bandwidth LTF is after the EHT-STF.

Example 18 includes the subject matter of Example 17, and optionally, wherein the NDP comprises an EHT Signal (EHT-SIG) field between the U-SIG field and the EHT-STF.

Example 19 includes the subject matter of Example 17, and optionally, wherein the EHT-STF is immediately after the U-SIG field.

Example 20 includes the subject matter of any one of Examples 1-15, and optionally, wherein the NDP comprises a High-Efficiency (HE) Signal A (HE-SIG-A) field after the RL-SIG field, an Extended HE-STF after the HE-SIG field, and an Extended HE-LTF after the extended HE-STF, wherein the Extended HE-LTF comprises the wide bandwidth LTF.

Example 21 includes the subject matter of Example 20, and optionally, wherein the L-STF, the L-LTF, the L-SIG field, the RL-SIG field, and the HE-SIG-A field are duplicated over a plurality of 20 MHz channel widths forming the wide channel bandwidth.

Example 22 includes the subject matter of Example 20 or 21, and optionally, wherein the extended HE-STF comprises an HE-STF sequence repeated with phase rotation over a plurality of 160 MHz channel widths forming the wide channel bandwidth.

Example 23 includes the subject matter of any one of Examples 1-22, and optionally, comprising a radio to transmit the NDP.

Example 24 includes the subject matter of Example 23, and optionally, comprising one or more antennas connected to the radio, and a processor to execute instructions of an operating system of the wireless communication device.

Example 25 comprises a wireless communication device comprising the apparatus of any of Examples 1-24.

Example 26 comprises an apparatus comprising means for executing any of the described operations of any of Examples 1-24.

Example 27 comprises a product comprising one or more tangible computer-readable non-transitory storage media comprising computer-executable instructions operable to, when executed by at least one processor, enable the at least one processor to cause a wireless communication device to perform any of the described operations of any of Examples 1-24.

Example 28 comprises an apparatus comprising: a memory interface; and processing circuitry configured to: perform any of the described operations of any of Examples 1-24.

Example 29 comprises a method comprising any of the described operations of any of Examples 1-24.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:

generate a wide bandwidth Long Training Field (LTF) configured for channel sounding over a wide channel bandwidth of at least 320 Megahertz (MHz), the wide bandwidth LTF comprising a plurality of Orthogonal Frequency Division Multiplexing (OFDM) symbols over the wide channel bandwidth; and transmit a Null Data Packet (NDP) over the wide channel bandwidth, the NDP comprising a non-High-Throughput (non-HT) Short Training Field (L-STF), a non-HT LTF (L-LTF) after the L-STF, a non-HT Signal (L-SIG) field after the L-LTF, a Repeated L-SIG (RL-SIG) field after the L-SIG field, and the wide bandwidth LTF after the RL-SIG field.

2. The apparatus of claim 1, wherein the wide bandwidth LTF comprises a secure wide bandwidth LTF, wherein an OFDM symbol of the plurality of OFDM symbols comprises a plurality of encrypted Quadrature Amplitude Modulation (QAM) symbols over a plurality of subcarriers.

3. The apparatus of claim 2, wherein the plurality of encrypted QAM symbols comprises a plurality of encrypted 64-QAM symbols.

4. The apparatus of claim 2, wherein the secure wide bandwidth LTF comprises a zero-power guard interval.

5. The apparatus of claim 2 configured to cause the wireless communication device to puncture the wide bandwidth LTF over one or more punctured sub-bands in the wide channel bandwidth.

6. The apparatus of claim 5 comprising:

a segment parser configured to parse a stream of encryption bytes into at least three streams;

a QAM modulator configured to generate at least three QAM symbol streams by modulating the at least three streams according to a QAM scheme;

a QAM symbol mapper configured to map QAM symbols of the at least three QAM symbol streams to sub-carriers of at least three respective sub-bands in the wide channel bandwidth; and a sub-band puncturer configured to remove QAM symbols mapped to the one or more punctured sub-bands.

7. The apparatus of claim 5 comprising:

a segment parser configured to parse a stream of encryption bytes into at least three streams based on the one or more punctured sub-bands;

a QAM modulator configured to generate at least three QAM symbol streams by modulating the at least three streams according to a QAM scheme; and a QAM symbol mapper configured to map QAM symbols of the at least three QAM symbol streams to sub-carriers of at least three respective sub-bands in the wide channel bandwidth based on the one or more punctured sub-bands.

8. The apparatus of claim 5 comprising:

a segment parser configured to parse a stream of encryption bytes into a plurality of streams;

a QAM modulator configured to generate a plurality of QAM symbol streams by modulating the plurality of streams according to a QAM scheme;

a QAM symbol mapper configured to map QAM symbols of the plurality of QAM symbol streams to a sounding signal over sub-carriers of a plurality of respective sub-bands in a first part of the wide channel bandwidth;

a duplicator configured to duplicate the sounding signal, with phase rotation, over sub-carriers of a plurality of respective sub-bands in a second part of the wide channel bandwidth; and a sub-band puncturer configured to remove QAM symbols mapped to the one or more punctured sub-bands.

9. The apparatus of claim 1 configured to cause the wireless communication device to transmit an NDP Announcement (NDPA) prior to the NDP, the NDPA comprising a dialog token field comprising two bits to indicate a type of the NDPA.

10. The apparatus of claim 9 configured to cause the wireless communication device to set the two bits to indicate a ranging NDPA.

11. The apparatus of claim 9 configured to cause the wireless communication device to set the two bits to indicate an Extremely High Throughput (EHT) NDPA.

12. The apparatus of claim 1 configured to cause the wireless communication device to transmit an NDP Announcement (NDPA) prior to the NDP, the NDPA comprising an indication of a wide channel bandwidth NDPA for channel sounding.

13. The apparatus of claim 1 configured to cause the wireless communication device to transmit an NDP Announcement (NDPA) prior to the NDP, the NDPA comprising at least one of an indication of the wide channel bandwidth, or an indication of one or more punctured sub-bands in the wide channel bandwidth.

14. The apparatus of claim 1 configured to cause the wireless communication device to set a preamble of the NDP comprising at least one of an indication of the wide channel bandwidth, or an indication of one or more punctured sub-bands in the wide channel bandwidth.

15. The apparatus of claim 1, wherein the NDP comprises a Unified Signal (U-SIG) field after the RL-SIG field, and an Extremely High Throughput (EHT) STF (EHT-STF) after the U-SIG field, wherein the wide bandwidth LTF is after the EHT-STF.

16. The apparatus of claim 1, wherein the NDP comprises a High-Efficiency (HE) Signal A (HE-SIG-A) field after the RL-SIG field, an Extended HE-STF after the HE-SIG field, and an Extended HE-LTF after the extended HE-STF, wherein the Extended HE-LTF comprises the wide bandwidth LTF.

17. The apparatus of claim 1 comprising a radio to transmit the NDP.

18. The apparatus of claim 17 comprising one or more antennas connected to the radio, and a processor to execute instructions of an operating system of the wireless communication device.

19. A product comprising one or more tangible computer-readable non-transitory storage media comprising instructions operable to, when executed by at least one processor, enable the at least one processor to cause a wireless communication device to:

generate a wide bandwidth Long Training Field (LTF) configured for channel sounding over a wide channel bandwidth of at least 320 Megahertz (MHz), the wide bandwidth LTF comprising a plurality of Orthogonal Frequency Division Multiplexing (OFDM) symbols over the wide channel bandwidth; and transmit a Null Data Packet (NDP) over the wide channel bandwidth, the NDP comprising a non-High-Throughput (non-HT) Short Training Field (L-STF), a non-HT LTF (L-LTF) after the L-STF, a non-HT Signal (L-SIG) field after the L-LTF, a Repeated L-SIG (RL-SIG) field after the L-SIG field, and the wide bandwidth LTF after the RL-SIG field.

20. The product of claim 19, wherein the wide bandwidth LTF comprises a secure wide bandwidth LTF, wherein an OFDM symbol of the plurality of OFDM symbols comprises a plurality of encrypted Quadrature Amplitude Modulation (QAM) symbols over a plurality of subcarriers.

* * * * *